United States Patent
Takano et al.

(10) Patent No.: US 8,761,121 B2
(45) Date of Patent: Jun. 24, 2014

(54) METHOD FOR PERFORMING HANDOVER, USER EQUIPMENT, BASE STATION, AND RADIO COMMUNICATION SYSTEM

(75) Inventors: Hiroaki Takano, Tokyo (JP); Kazuyuki Sakoda, Tokyo (JP)

(73) Assignee: Sony Corporation, Tokyo (JP)

( * ) Notice: Subject to any disclaimer, the term of this patent is extended or adjusted under 35 U.S.C. 154(b) by 84 days.

(21) Appl. No.: 13/514,067

(22) PCT Filed: Dec. 2, 2010

(86) PCT No.: PCT/JP2010/007036
§ 371 (c)(1),
(2), (4) Date: Jun. 6, 2012

(87) PCT Pub. No.: WO2011/074200
PCT Pub. Date: Jun. 23, 2011

(65) Prior Publication Data
US 2012/0236829 A1  Sep. 20, 2012

(30) Foreign Application Priority Data

Dec. 16, 2009 (JP) ................................. 2009-285373

(51) Int. Cl.
*H04W 36/00* (2009.01)
(52) U.S. Cl.
USPC ........................................................ 370/331
(58) Field of Classification Search
CPC . H04W 80/04; H04W 36/18; H04W 36/0011; H04W 36/14; H04W 36/08
USPC .......................................... 370/331; 455/436
See application file for complete search history.

(56) References Cited

U.S. PATENT DOCUMENTS

| | | | | |
|---|---|---|---|---|
| 7,903,603 | B2* | 3/2011 | Lee et al. | 370/328 |
| 8,121,094 | B2* | 2/2012 | Park et al. | 370/332 |
| 8,295,841 | B2* | 10/2012 | Hwang et al. | 455/436 |
| 8,311,542 | B2* | 11/2012 | Persson et al. | 455/436 |
| 8,493,928 | B2* | 7/2013 | Watanabe et al. | 370/331 |
| 2002/0037725 | A1* | 3/2002 | Masuda et al. | 455/436 |
| 2012/0002643 | A1* | 1/2012 | Chung et al. | 370/331 |
| 2012/0039302 | A1* | 2/2012 | Chun et al. | 370/331 |
| 2012/0076042 | A1* | 3/2012 | Chun et al. | 370/252 |
| 2012/0106499 | A1* | 5/2012 | Seo et al. | 370/329 |
| 2012/0275434 | A1* | 11/2012 | Ode et al. | 370/331 |

FOREIGN PATENT DOCUMENTS

| | | | | |
|---|---|---|---|---|
| EP | 2190241 A1 * | 5/2010 | | H04W 36/08 |
| JP | 2002-112304 | 4/2002 | | |
| JP | 2002 112304 | 4/2002 | | |
| JP | 2009 232293 | 10/2009 | | |

OTHER PUBLICATIONS

ETSI TS 23.009 ver 8.1.0, Mar. 2009, Handover Procedures.*

(Continued)

*Primary Examiner* — Mark Rinehart
*Assistant Examiner* — Peter Solinsky
(74) *Attorney, Agent, or Firm* — Oblon, Spivak, McClelland, Maier & Neustadt, L.L.P.

(57) ABSTRACT

According to embodiments, a base station includes a radio communication unit configured to establish communication with a mobile communication terminal using a plurality of component carriers. The base station further includes a control unit configured to transmit a command to the mobile communication terminal to reduce the plurality of component carriers to one prior to handover of communication between the mobile communication terminal and the base station to another base station.

17 Claims, 15 Drawing Sheets

(56) References Cited

OTHER PUBLICATIONS

3GPP TSG RAN WG1 #57b & WG2 #66b, Conference Report, Aug. 20, 1998.*

3GPP TSG RAN WG2 Meeting #66bis R2-093722, "Handover for Carrier Aggregation," CATT, Total 3 pages, (Jun. 29-Jul. 3, 2009).

3GPP TSG RAN WG2 Meeting #67 R2-094731, Intra LTE-A UE Handover Procedure inter-aNB for CA, Huawei, Total 5 pages, (Aug. 24-28, 2009).

International Search Report Issued Dec. 28, 2010 in PCT/JP10/07036 Filed Dec. 2, 2010.

Japanese Office Action issued Sep. 24, 2013, in Japan Patent Application No. 2009-285373.

* cited by examiner

METHOD FOR PERFORMING HANDOVER, USER EQUIPMENT, BASE STATION, AND RADIO COMMUNICATION SYSTEM

TECHNICAL FIELD

The present invention relates to a method for performing a handover, a user equipment, a base station, and a radio communication system.

BACKGROUND ART

In Long Term Evolution-Advanced (LTE-A), which is the next-generation cellular communication standard that is discussed in Third Generation Partnership Project (3GPP), introduction of technology called carrier aggregation (CA) has been studied. The carrier aggregation is technology that forms a communication channel between a user equipment (UE) and a base station (BS, or evolved Node B (eNB)) by aggregating a plurality of frequency bands that are supported in LTE, for example, and thereby improves communication throughput. Each frequency band included in one communication channel by the carrier aggregation is called a component carrier (CC). The bandwidths of frequency bands that are available in LTE are 1.4 MHz, 3.0 MHz, 5.0 MHz, 10 MHz, 15 MHz, and 20 MHz. Accordingly, if five bands of 20 MHz are aggregated as component carriers, a communication channel of 100 MHz in total can be formed.

Component carriers that are included in one communication channel in the carrier aggregation are not necessarily contiguous to one another in the frequency direction. The mode in which component carriers are arranged contiguous to one another in the frequency direction is called a contiguous mode. On the other hand, the mode in which component carriers are arranged not contiguous to one another is called a non-contiguous mode.

Further, in the carrier aggregation, the number of component carriers in an uplink and the number of component carriers in a downlink are not necessarily equal. The mode in which the number of component carriers in an uplink and the number of component carriers in a downlink are equal is called a symmetric mode. On the other hand, the mode in which the number of component carriers in an uplink and the number of component carriers in a downlink are not equal is called an asymmetric mode. For example, in the case of using two component carriers in an uplink and three component carriers in a downlink, it is asymmetric carrier aggregation.

Further, in LTE, any one of frequency division duplex (FDD) and time division duplex (TDD) can be used as duplex operation. Because the direction of a link (uplink or downlink) of each component carrier does not change in time in FDD, FDD is better suited to the carrier aggregation compared to TDD.

A handover, which is a basic technique for achieving the mobility of a user equipment in the cellular communication standard, is one of important subjects in LTE-A. In LTE, a user equipment measures a communication quality over a channel with a serving base station (a currently connected base station) and communication qualities with peripheral base stations and transmits a measurement report containing measurements to the serving base station. Receiving the measurement report, the serving base station determines whether to execute a handover based on the measurements contained in the report. Then, if it is determined that a handover is to be executed, a handover is carried out among a source base station (the serving base station before a handover), the user equipment, and a target base station (a serving base station after a handover) in accordance with a prescribed procedure (e.g. cf. Patent Literature 1 below)

CITATION LIST

Patent Literature

PTL 1: Japanese Unexamined Patent Application Publication No. 2009-232293

SUMMARY OF INVENTION

Technical Problem

However, no case has been reported where active consideration is given to how to carry out a handover procedure in a radio communication involving the carrier aggregation.

In the above-described existing handover procedure, processing such as request for a handover, confirmation of the request, issue of a handover command or random access to a target base station is performed based on the assumption that one communication channel is composed of one component carrier. In a radio communication involving the carrier aggregation also, it is desirable to perform such processing in the same manner as the existing procedure in order not to cause a significant impact on a system or a device which is widely used today.

In light of the foregoing, it is desirable to provide a novel and improved method for performing a handover, user equipment, base station, and radio communication system that can carry out a handover during a radio communication involving the carrier aggregation without causing a significant impact on an existing system or device.

Solution to Problem

According to some embodiments, a base station includes a radio communication unit configured to establish communication with a mobile communication terminal using a plurality of component carriers. The base station further includes a control unit configured to transmit a command to the mobile communication terminal to reduce the plurality of component carriers to one prior to handover of communication between the mobile communication terminal and the base station to another base station.

According to some embodiments, a mobile communication terminal includes a radio communication unit configured to establish communication with a base station using a plurality of component carriers. The mobile communication terminal further includes a control unit configured to receive a command from the base station to reduce the plurality of component carriers to one prior to handover of communication between the mobile communication terminal and the base station to another base station.

According to some embodiments, a communication system includes a first base station and a mobile communication terminal. The first base station includes a radio communication unit configured to establish communication with a mobile communication terminal using a plurality of component carriers. The first base station further includes a first control unit configured to transmit a command to the mobile communication terminal to reduce the plurality of component carriers to one prior to handover of communication between the mobile communication terminal and the base station to a second base station. The mobile communication terminal includes a second control unit configured to reduce the plurality of component carriers to one upon reception of the command from the first base station.

According to some embodiments, a non-transitory computer readable medium having instructions stored thereon, which when executed by a processor in a base station causes the processor to establish communication with a mobile communication terminal using a plurality of component carriers. The instructions further cause the processor to transmit a command to the mobile communication terminal to reduce the plurality of component carriers to one prior to handover of communication between the mobile communication terminal and the base station to another base station.

Advantageous Effects of Invention

As described above, the method for performing a handover, the user equipment, the base station, and the radio communication system according to the embodiments of the present invention can carry out a handover during a radio communication involving the carrier aggregation without causing a significant impact on an existing system or device.

DESCRIPTION OF EMBODIMENTS

Figure 1:
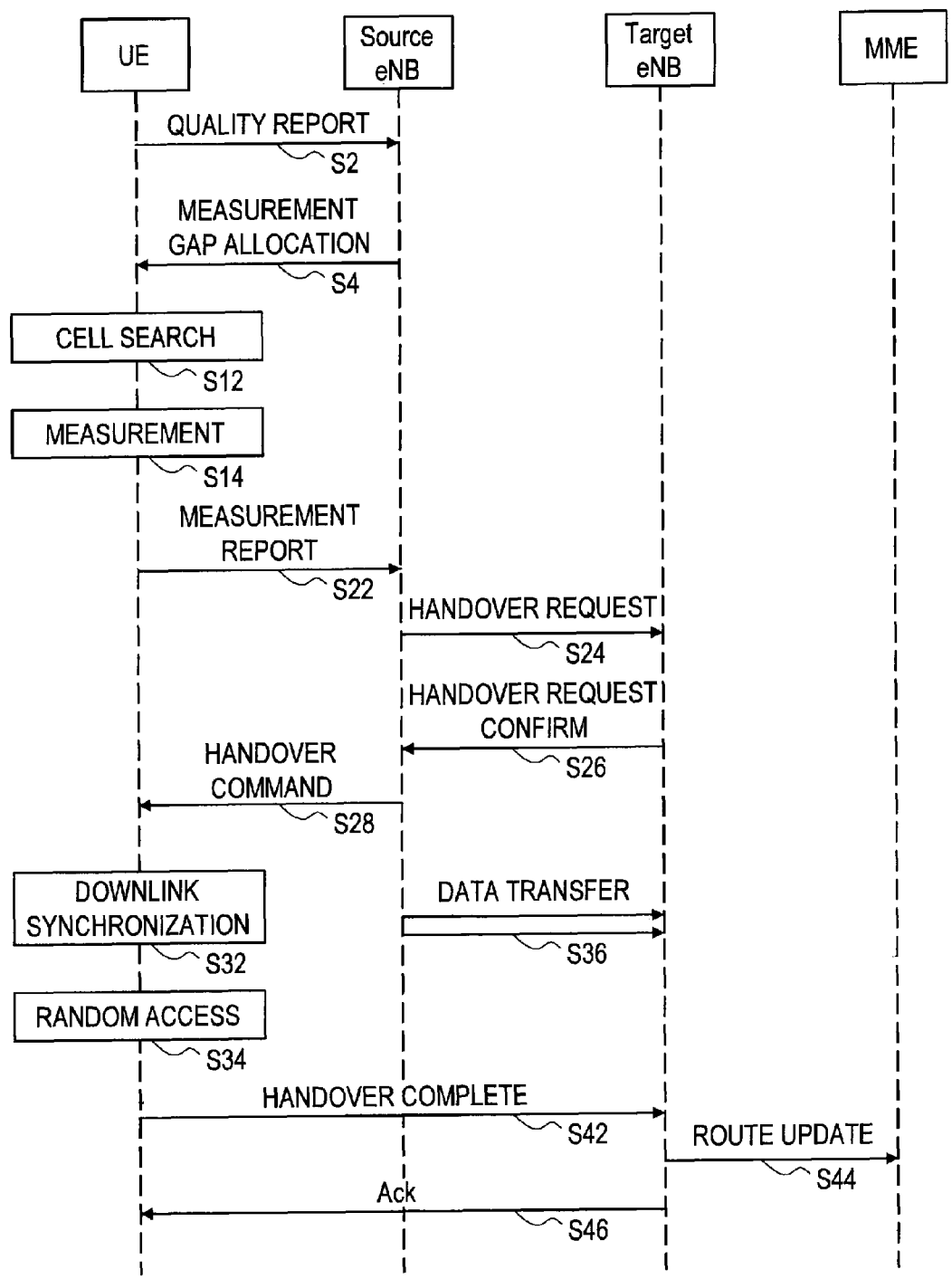
FIG. 1 is a sequence chart to describe a flow of a typical handover procedure.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Preferred embodiments of the present invention will be described hereinafter in the following order.

1. Description of Related Art
1-1. Handover Procedure
1-2. Structure of Communication Resource
2. Outline of Radio Communication System
3. Description of First Embodiment
3-1. Exemplary Configuration of User Equipment
3-2. Exemplary Configuration of Base Station
3-3. Flow of Process
3-4. Summary of First Embodiment
4. Description of Second Embodiment
4-1. Exemplary Configuration of User Equipment
4-2. Exemplary Configuration of Base Station
4-3. Flow of Process
4-4. Summary of Second Embodiment
5. Description of Third Embodiment
5-1. Exemplary Configuration of User Equipment
5-2. Exemplary Configuration of Base Station
5-3. Flow of Process
5-4. Summary of Third Embodiment 1. Description of Related Art 1-1. Handover Procedure A technique related to the present invention is described hereinafter with reference to FIGS. 1 and 2. FIG. 1 shows a flow of a handover procedure in conformity with LTE in a radio communication not involving the carrier aggregation as an example of a typical handover procedure. In this example, a user equipment (UE), a source base station (source eNB), a target base station (target eNB), and a mobility management entity (MME) are involved in the handover procedure.

As a preliminary step toward a handover, the user equipment first reports the channel quality of a communication channel between the user equipment and the source base station to the source base station (step S2). The channel quality may be reported on a regular basis or when the channel quality falls below a predetermined reference value. The user equipment can measure the channel quality of the communication channel with the source base station by receiving a reference signal contained in a downlink channel from the source base station.

Then, the source base station determines the needs of measurement based on the quality report received from the user equipment and, if measurement is necessary, allocates measurement gaps to the user equipment (step S4).

Then, the user equipment searches for a downlink channel from a peripheral base station (i.e. performs cell search) during the periods of the allocated measurement gaps (step S12). Note that the user equipment can recognize a peripheral base station to search according to a list that is provided in advance from the source base station.

When the user equipment acquires synchronization with a downlink channel, the user equipment performs measurement by using a reference signal contained in the downlink channel (step S14). During this period, the source base station restricts an allocation of data communication related to the user equipment so as to avoid occurrence of data transmission by the user equipment.

Upon completion of the measurement, the user equipment transmits a measurement report containing measurements to the source base station (step S22). The measurements contained in the measurement report may be the average value or the central value of measured values over a plurality of times of measurement or the like. Further, the measurements may contain data about a plurality of frequency bands.

Receiving the measurement report, the source base station determines whether or not to execute a handover based on the contents of the measurement report. For example, when the channel quality of another base station in the periphery is higher than the channel quality of the source base station by a predetermined threshold or greater, it can be determined that a handover is necessary. In this case, the source base station determines to carry out a handover procedure with the relevant another base station as a target base station, and transmits a handover request message to the target base station (step S24).

Receiving the handover request message, the target base station determines whether it is possible to accept the user equipment according to the availability of a communication service offered by itself or the like. When it is possible to accept the user equipment, the target base station transmits a handover request confirm message to the source base station (step S26).

Receiving the handover request confirm message, the source base station transmits a handover command to the user equipment (step S28). Then, the user equipment acquires synchronization with the downlink channel of the target base station (step S32). After that, the user equipment makes a random access to the target base station by using a random access channel in a given time slot (step S34). During this period, the source base station forwards data addressed to the user equipment to the target base station (step S36). Then, after success in the random access, the user equipment transmits a handover complete message to the target base station (step S42).

Receiving the handover complete message, the target base station requests the MME to perform route update for the user equipment (step S44). Upon updating the route of user data by the MME, the user equipment becomes able to communicate with another device through a new base station (i.e. the target base station). Then, the target base station transmits acknowledgement to the user equipment (step S46). A series of handover procedure thereby ends.

1-2. Structure of Communication Resource

Figure 2:
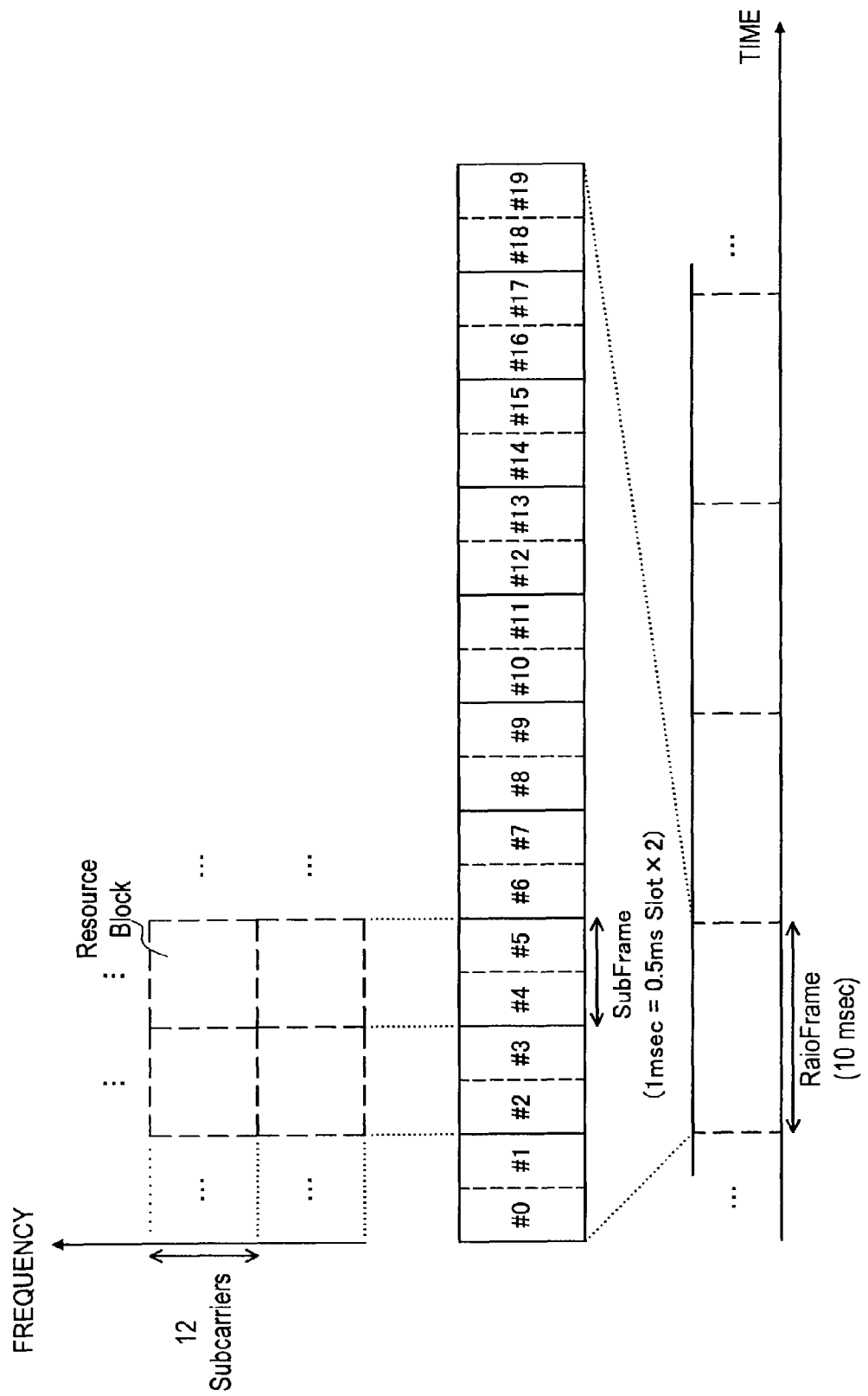
FIG. 2 is an explanatory view to describe an example of a structure of a communication resource.

FIG. 2 shows a structure of a communication resource in LTE as an example of a structure of a communication resource to which the present invention is applicable. Referring to FIG. 2, the communication resource in LTE is segmented in the time direction into radio frames each having a length of 10 msec. One radio frame includes ten sub-frames, and one sub-frame is made up of two 0.5 msec slots. In LTE, the sub-frame is one unit of an allocation of a communication resource to each user equipment in the time direction. Such one unit is called a resource block. One resource block includes twelve sub-carriers in the frequency direction. Specifically, one resource block has a size of 1 msec with 12 sub-carriers in the time-frequency domain. Throughput of data communication increases as a larger number of resource blocks are allocated for data communication on condition of the same bandwidth and time length. Further, in such a structure of a communication resource, a part of radio frame with a given frequency band is reserved as a random access channel. The random access channel can be used for an access to a base station by a user equipment that has changed from an idle mode to an active mode or an initial access to a target base station in a handover procedure, for example.

2. Outline of Radio Communication System

Figure 3:
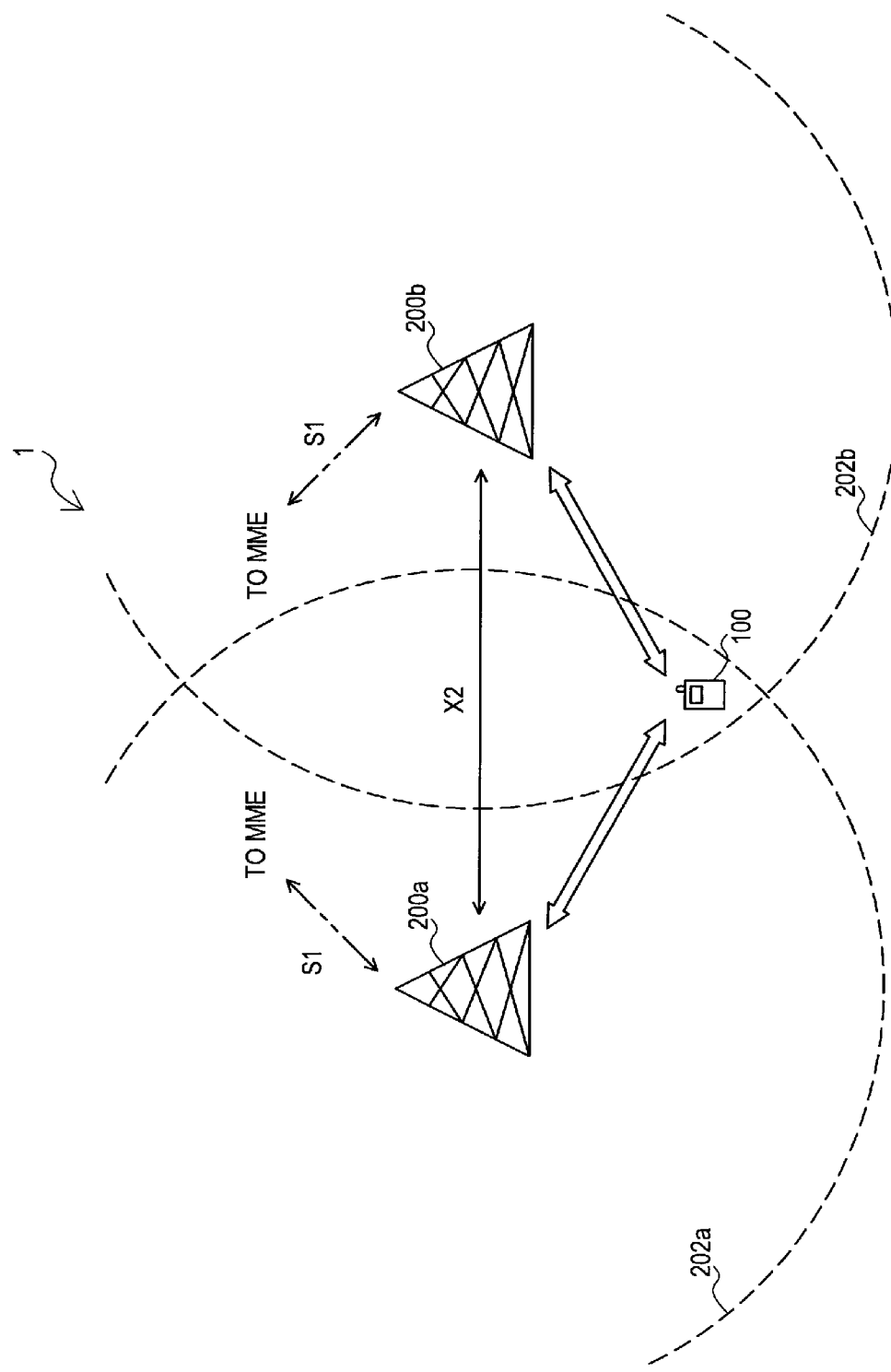
FIG. 3 is a schematic view showing an outline of a radio communication system according to an embodiment.

FIG. 3 is a schematic view showing an outline of a radio communication system 1 according to an embodiment of the present invention. Referring to FIG. 3, the radio communication system 1 includes a user equipment 100, a base station 200a and a base station 200b. It is assumed that the base station 200a is a serving base station for the user equipment 100.

The user equipment 100 is located inside a cell 202a where a radio communication service is provided by the base station 200a. The user equipment 100 can perform a data communication with another user equipment (not shown) via the base station 200a over a communication channel formed by aggregating a plurality of component carriers (i.e. by carrier aggregation). However, because the distance between the user equipment 100 and the base station 200a is not short, there is a possibility that a handover is required for the user equipment 100. Further, the user equipment 100 is located inside a cell 202b where a radio communication service is provided by the base station 200b. Therefore, the base station 200b can be a candidate for a target base station for a handover of the user equipment 100.

The base station 200a can communicate with the base station 200b through a backhaul link (e.g. X2 interface). Various kinds of messages in the handover procedure as described with reference to FIG. 1, scheduling information related to the user equipment belonging to each cell or the like, for example, can be transmitted and received between the base station 200a and the base station 200b. Further, the base station 200a and the base station 200b can communicate with the MME, which is an upper node, through S1 interface, for example.

It is now assumed that the necessity of a handover to the base station 200b arises while the user equipment 100 performs a radio communication involving the carrier aggregation with the base station 200a. In this case, as a way to carry out a handover among the user equipment 100, the base station 200a and the base station 200b without largely altering the existing handover procedure described with reference to FIG. 1, the number of component carriers constituent of a communication channel may be shrunk temporarily. Shrinking the number of component carriers means reducing the number of component carriers constituent of one communication channel by the carrier aggregation technology. For example, if the number of component carriers is temporarily shrunk to one, a handover can be carried out according to the same procedure as the existing handover procedure. However, the reduction of the number of component carriers can cause a temporary decrease in throughput. The decrease in throughput raises the possibility of the occurrence of buffer under flow at the receiving end of data or buffer over flow at the transmitting end of data, which can lead to a failure of a communication service such as contents delivery. Therefore, in the case of temporarily shrinking the number of component carriers, it is effective to avoid or reduce the above-described possibility due to a decrease in throughput as much as possible as in the first to third embodiments of the present invention which are described in detail in the following sections.

It should be noted that, when there is no particular need to distinguish between the base station 200a and the base station 200b in the following description of the specification, they are collectively referred to as a base station 200 by omitting the alphabetical letter at the end of the reference symbol. The same applies to the other elements.

3. Description of First Embodiment

A first embodiment of the present invention is described hereinafter with reference to FIGS. 4 to 8.

3-1. Exemplary Configuration of User Equipment

Figure 4:
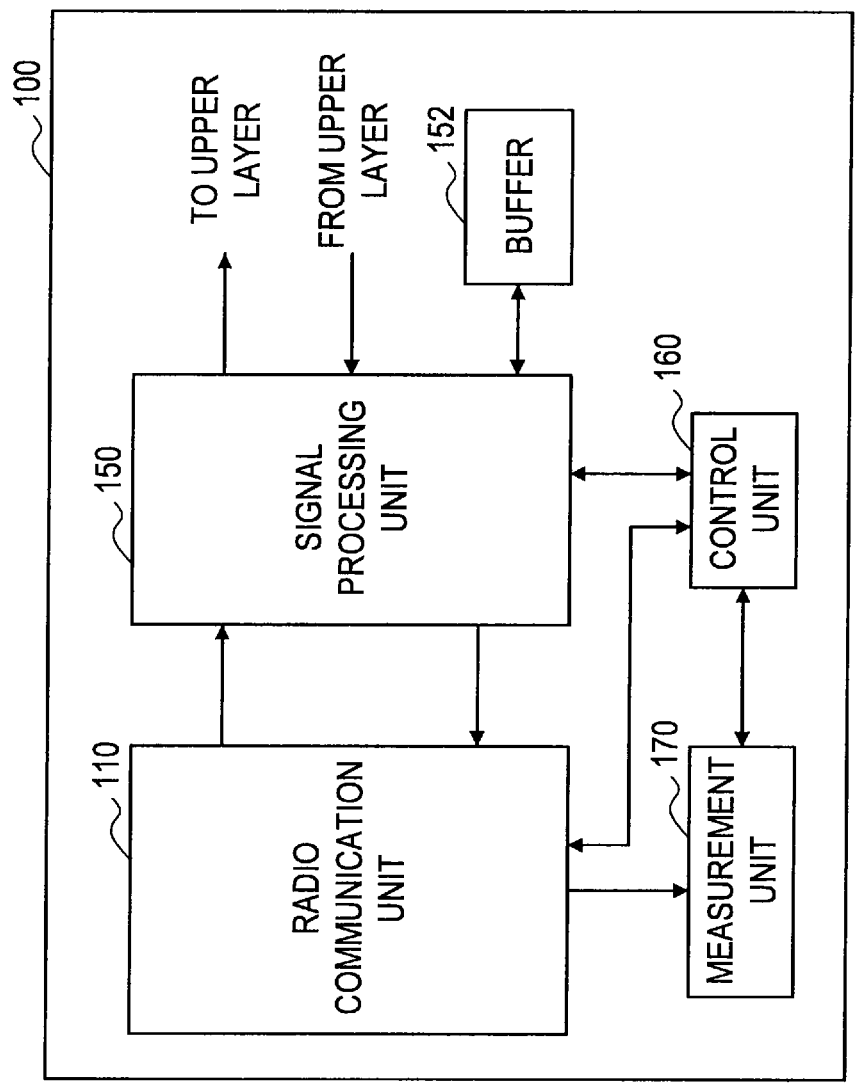
FIG. 4 is a block diagram showing an example of a configuration of a user equipment according to a first embodiment.

FIG. 4 is a block diagram showing an example of a configuration of the user equipment 100 according to the embodiment. Referring to FIG. 4, the user equipment 100 includes a radio communication unit 110, a signal processing unit 150, a buffer 152, a control unit 160, and a measurement unit 170.

(Radio Communication Unit)

The radio communication unit 110 performs a radio communication with the base station 200 over a communication channel formed by aggregating a plurality of component carriers with use of the carrier aggregation technology.

Figure 5:
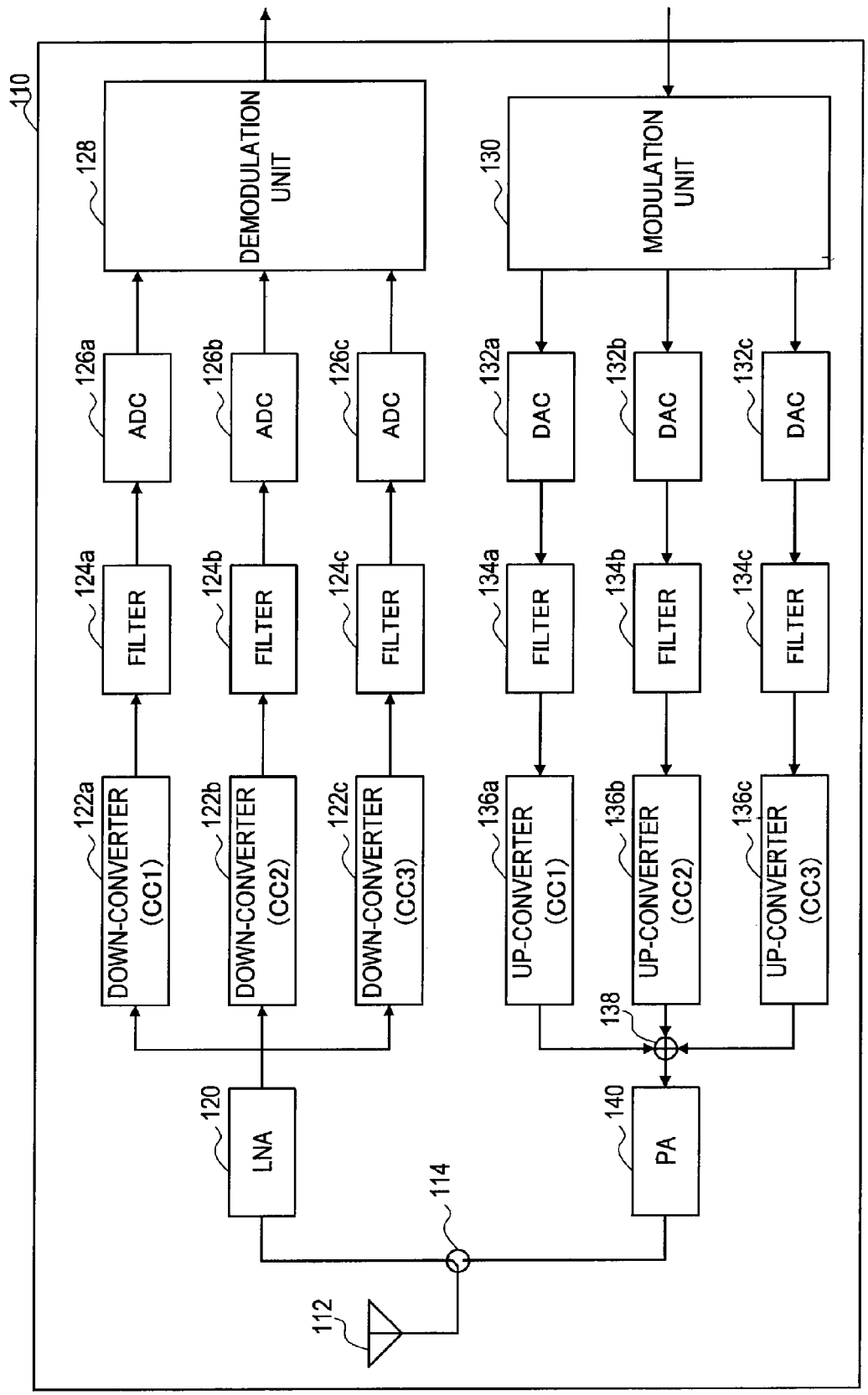
FIG. 5 is a block diagram showing an example of a detailed configuration of a radio communication unit according to the first embodiment.

FIG. 5 is a block diagram showing an example of a more detailed configuration of the radio communication unit 110. Referring to FIG. 5, the radio communication unit 110 includes an antenna 112, a switch 114, a low noise amplifier (LNA) 120, a plurality of down-converters 122a to 122c, a plurality of filters 124a to 124c, a plurality of analogue-to-digital converters (ADCs) 126a to 126c, a demodulation unit 128, a modulation unit 130, a plurality of digital-to-analogue converters (DACs) 132a to 132c, a plurality of filters 134a to 134c, a plurality of up-converters 136a to 136c, a combiner 138, and a power amplifier (PA) 140.

The antenna 112 receives a radio signal transmitted from the base station 200 and outputs the received signal to the LNA 120 through the switch 114. The LNA 120 amplifies the received signal. The down-converter 122a and the filter 124a separate a baseband signal of the first component carrier (CC1) from the received signal amplified by the LNA 120. Then, the separated baseband signal is converted to a digital signal by the ADC 126a and output to the demodulation unit 128. Likewise, the down-converter 122b and the filter 124b separate a baseband signal of the second component carrier (CC2) from the received signal amplified by the LNA 120. Then, the separated baseband signal is converted to a digital signal by the ADC 126b and output to the demodulation unit 128. Further, the down-converter 122c and the filter 124c separate a baseband signal of the third component carrier (CC3) from the received signal amplified by the LNA 120. Then, the separated baseband signal is converted to a digital signal by the ADC 126c and output to the demodulation unit 128. After that, the demodulation unit 128 generates a data signal by demodulating the baseband signals of the respective component carriers and outputs the data signal to the signal processing unit 150.

Further, when a data signal is input from the signal processing unit 150, the modulation unit 130 modulates the data signal and generates baseband signals of the respective component carriers. Among those baseband signals, the baseband signal of the first component carrier (CC1) is converted to an analog signal by the DAC 132a. Then, a frequency component corresponding to the first component carrier in a transmission signal is generated from the analog signal by the filter 134a and the up-converter 136a. Likewise, the baseband signal of the second component carrier (CC2) is converted to an analog signal by the DAC 132b. Then, a frequency component corresponding to the second component carrier in the transmission signal is generated from the analog signal by the filter 134b and the up-converter 136b. Further, the baseband signal of the third component carrier (CC3) is converted to an analog signal by the DAC 132c. Then, a frequency component corresponding to the third component carrier in the transmission signal is generated from the analog signal by the filter 134c and the up-converter 136c. After that, the generated frequency components corresponding to the three component carriers are combined by the combiner 138, and the transmission signal is formed. The PA 140 amplifiers the transmission signal and outputs the transmission signal to the antenna 112 through the switch 114. Then, the antenna 112 transmits the transmission signal as a radio signal to the base station 200.

Although the case where the radio communication unit 110 handles three component carriers is described in FIG. 5, the number of component carriers handled by the radio communication unit 110 may be two, or four or more.

Further, instead of processing the signals of the respective component carriers in the analog region as in the example of FIG. 5, the radio communication unit 110 may process the signals of the respective component carriers in the digital region. In the latter case, at the time of reception, a digital signal converted by one ADC is separated into the signals of the respective component carriers by a digital filter. Further, at the time of transmission, after digital signals of the respective component carriers are frequency-converted and combined, the signal is converted into an analog signal by one DAC. The load of the ADC and the DAC is generally smaller when processing the signals of the respective component carriers in the analog region. On the other hand, when processing the signals of the respective component carriers in the digital region, a sampling frequency for AD/DA conversion is higher, and the load of the ADC and the DAC can thereby increase.

(Signal Processing Unit)

Referring back to FIG. 4, an example of a configuration of the user equipment 100 is further described below.

The signal processing unit 150 performs signal processing such as deinterleaving, decoding or error correction on the demodulated data signal that is input from the radio communication unit 110. Then, the signal processing unit 150 outputs the processed data signal to an upper layer. Note that the signal processing unit 150 performs buffer control of data signals by using the buffer 152. Specifically, the signal processing unit 150 stores processed data signals into the buffer 152 once and then outputs the data signal to an upper layer, following the first-in first-out (FIFO) rule, for example. Thus, when the data signals are input at a rate exceeding a normal data rate of a communication service, the amount of data accumulated in the buffer 152 increases. Further, when the input rate of the data signals decreases, the amount of data accumulated in the buffer 152 decreases. Further, the signal processing unit 150 performs signal processing such as encoding or interleaving on the data signal that is input from the upper layer. In this case also, the signal processing unit 150 may perform buffer control of data signals by using the buffer 152. Then, the signal processing unit 150 outputs the processed data signals to the radio communication unit 110.

(Buffer)

The buffer 152 temporarily accumulates the data signals that are input from the signal processing unit 150 by using a storage medium such as a hard disk or semi-conductor memory. The data signals are read following the first-in first-out rule, for example, and processed by the signal processing unit 150.

(Control Unit)

According to some embodiments, the control unit is further configured to restart use of the plurality of component carriers after completion of the handover. In further embodiments, the control unit is further configured to receive a command from the base station to increase data throughput of the communication between the mobile communication terminal and the base station prior to reception of the command to reduce the plurality of component carriers to one. In additional embodiments, the command from the base station to increase the data throughput instructs the control unit to increase the plurality of component carriers used between the base station and mobile communication terminal.

The control unit 160 controls the overall functions of the user equipment 100 by using a processing device such as a central processing unit (CPU) or a digital signal processor (DSP). For example, the control unit 160 controls the timing of data communication by the radio communication unit 110 according to scheduling information that is received from the base station 200 by the radio communication unit 110. Further, the control unit 160 increases or decreases the number of component carriers constituent of the communication channel with the base station 200 according to a command from the base station 200. For example, when an expansion (increase) command of the number of component carriers is received from the base station 200, the control unit 160 increases the number of component carriers. Further, when a shrink command of the number of component carriers is received from the base station 200, the control unit 160 decreases the number of component carriers. Besides, the control unit 160 controls the user equipment 100 to operate in the same manner as the user equipment in the handover procedure which is descried with reference to FIG. 1.

(Measurement Unit)

The measurement unit 170 measures the channel quality for each of the component carriers by using a reference signal from the base station 200 according to control from the control unit 160, for example. Further, the measurement unit 170 executes measurement for a handover with respect to each of the component carriers by using the measurement gaps which are allocated by the base station 200. A result of the measurement executed by the measurement unit 170 is converted to a predetermined format for a measurement report by the control unit 160 and transmitted to the base station 200 through the radio communication unit 110. After that, the base station 200 determines, based on the measurement report, whether a handover should be executed or not for the user equipment 100.

3-2. Exemplary Configuration of Base Station

Figure 6:
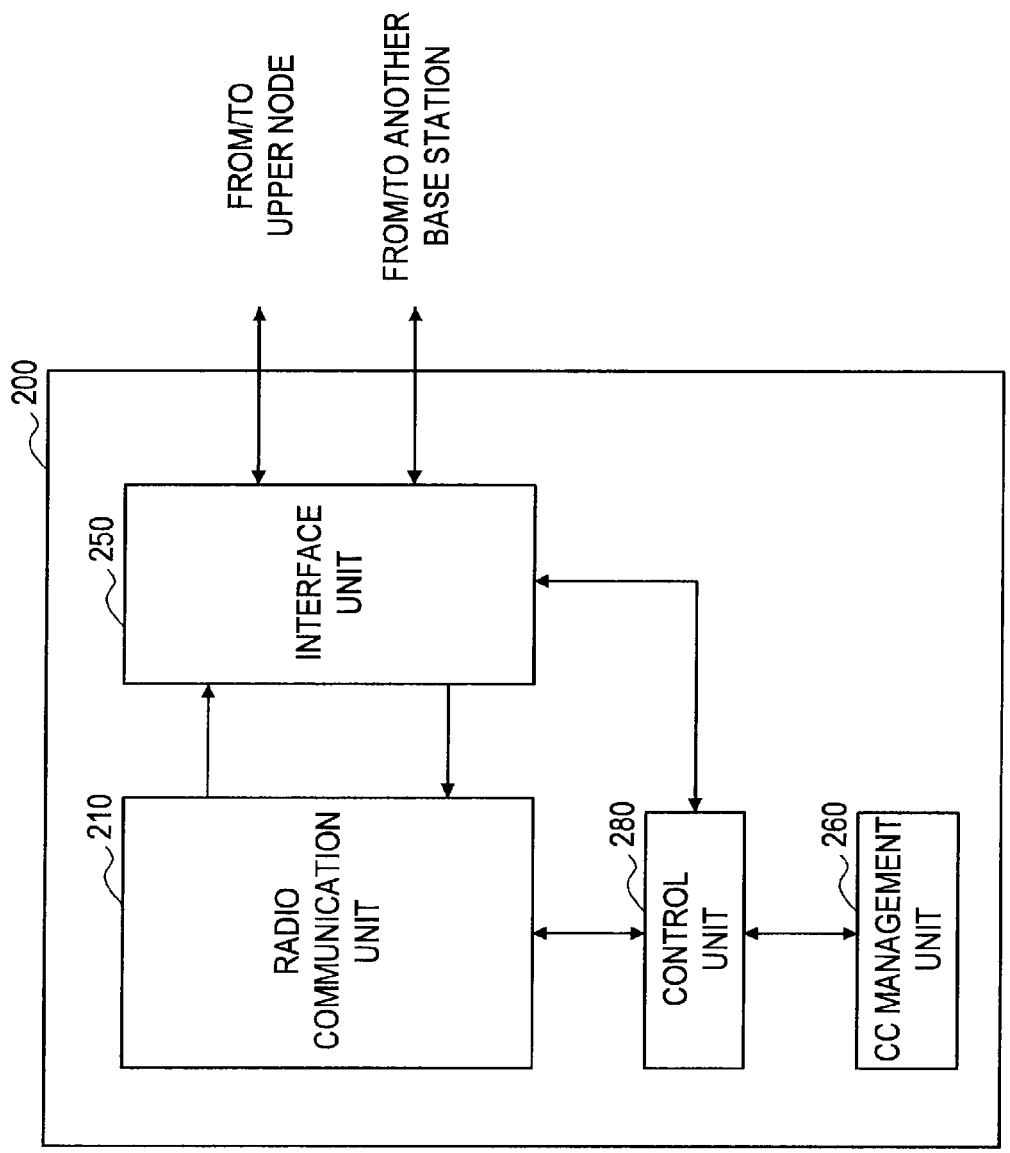
FIG. 6 is a block diagram showing an example of a configuration of a base station according to the first embodiment.

FIG. 6 is a block diagram showing an example of a configuration of the base station 200 according to the embodiment. Referring to FIG. 6, the base station 200 includes a radio communication unit 210, an interface unit 250, a component carrier (CC) management unit 260, and a control unit 280.

(Radio Communication Unit)

A specific configuration of the radio communication unit 210 may be similar to the configuration of the radio communication unit 110 of the user equipment 100 which is described above with reference to FIG. 5, although the number of component carriers to be supported, the requirements of processing performance or the like are different. The radio communication unit 210 performs a radio communication with the user equipment over a communication channel which is formed by aggregating a plurality of component carriers with use of the carrier aggregation technology.

(Interface Unit)

The interface unit 250 mediates a communication between the radio communication unit 210 or the control unit 280 and an upper node through the S1 interface illustrated in FIG. 3, for example. Further, the interface unit 250 mediates a communication between the radio communication unit 210 or the control unit 280 and another base station through the X2 interface illustrated in FIG. 3, for example.

(CC Management Unit)

The CC management unit 260 holds data that indicates which component carrier each user equipment is using for communication with respect to each of the user equipments belonging to the cell of the base station 200. Such data can be updated by the control unit 280 when an additional user equipment joins the cell of the base station 200 or when the connected user equipment changes its component carriers. Thus, the control unit 280 can recognize which component carrier the user equipment 100 is using by referring to the data held by the CC management unit 260.

(Control Unit)

According to some embodiments, the control unit is further configured to increase data throughput of the communication between the mobile communication terminal and the base station prior to transmitting the command to reduce the plurality of component carriers to one. In further embodiments, the control unit is further configured to transmit a command to the mobile communication terminal to increase the plurality of component carriers used between the base station and mobile communication terminal to increase the data throughput. In additional embodiments, the control unit is further configured to increase one or more resource blocks to be allocated to the mobile communication terminal in at least one component carrier from the plurality of component carriers to increase the data throughput.

The control unit 280 controls the overall functions of the base station 200 by using a processing device such as a CPU or a DSP. For example, the control unit 280 allocates communication resources for data communication to the user equipment 100 and other user equipments and then delivers scheduling information over a broadcast channel in a given sub-frame.

Further, in this embodiment, in the case where the base station 200 is a source base station, when a handover request is confirmed by a target base station, the control unit 280 temporarily increases the amount of communication resources to be allocated to the user equipment 100. The control unit 280 may increase the above-described amount of communication resources by increasing the number of component carriers constituent of the communication channel with the user equipment 100, for example. The number of component carriers can be increased by transmitting an expansion command of the number of component carriers to the user equipment 100, for example. Alternatively, the control unit 280 may increase the above-described amount of communication resources by increasing the number of resource blocks to be allocated to the user equipment 100 in at least one component carrier. After the control unit 280 transmits/receives data to/from the user equipment 100 at a higher rate than usual by using the communication resources which are increased in this manner, before transmitting a handover command to the user equipment 100, the control unit 280 transmits a shrink command of the number of component carriers to the user equipment 100. The number of component carriers constituent of the communication channel between the user equipment 100 and the base station 200 is thereby shrunk to one. Then, the control unit 280 transmits a handover command for one component carrier after the shrinkage to the user equipment 100.

Further, in the case where the base station 200 is a target base station, when a handover by the user equipment 100 is completed, the control unit 280 restarts the radio communication involving the carrier aggregation by the user equipment 100 in response to a request from the user equipment 100. Besides, the control unit 280 controls the base station 200 to operate in the same manner as the source base station or the target base station in the handover procedure which is descried with reference to FIG. 1.

3-3. Flow of Process

Two scenarios of a handover procedure according to the embodiment are described hereinbelow. Note that, in the following scenarios, it is assumed that a handover procedure is performed among the user equipment 100, the base station 200a serving as a source base station, and the base station 200b serving as a target base station. Further, for the procedure up to measurement in the user equipment (steps S2 to S14) in the typical handover procedure illustrated in FIG. 1, explanation is omitted because there is no significant difference.

Figure 7:
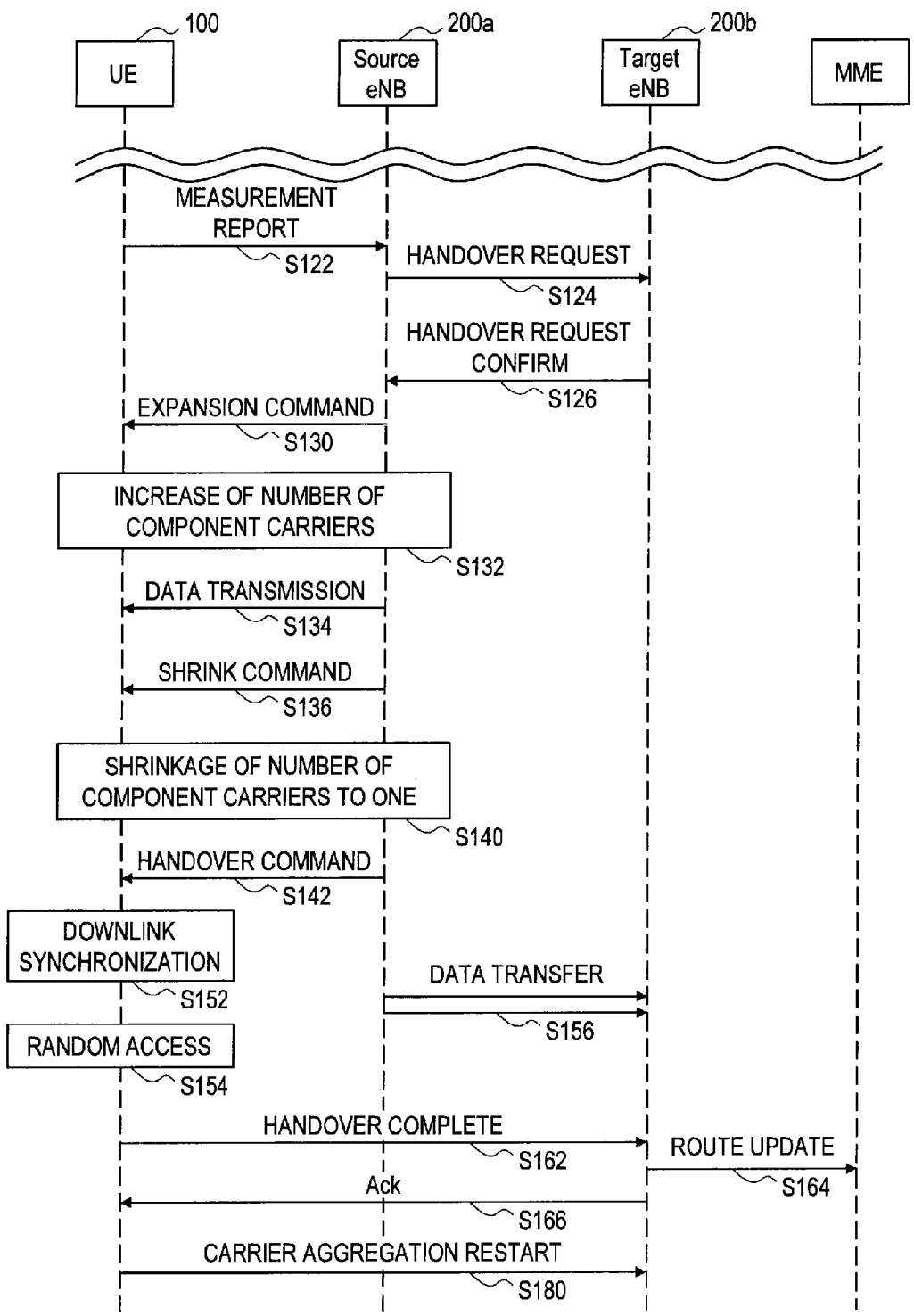
FIG. 7 is a sequence chart showing an example of a flow along a first scenario of a handover procedure according to the first embodiment.

FIG. 7 is a sequence chart showing an example of a flow along the first scenario of a handover procedure according to the embodiment. Referring to FIG. 7, the user equipment 100 first transmits a measurement report for a plurality of component carriers constituent of a communication channel to the base station 200a (step S122). Receiving the measurement report, the base station 200a determines the necessity of a handover based on the measurement report. For example, when a channel quality between the user equipment 100 and the base station 200b is better than a channel quality between the user equipment 100 and the base station 200a by a predetermined threshold or greater in any component carrier, it can be determined that a handover is necessary. In this case, the base station 200a transmits a handover request message to the base station 200b (step S124). Receiving the handover request message, the base station 200b determines whether it is possible to accept the user equipment 100 according to the availability of a communication service offered by itself or the like. When the base station 200b determines that it is possible to accept the user equipment 100, the base station 200b transmits a handover request confirm message to the base station 200a (step S126).

Receiving the handover request confirm message, the base station 200a transmits an expansion command for increasing the number of component carriers to the user equipment 100 (step S130). In response thereto, the user equipment 100 makes a random access to the base station 200a for a new component carrier to establish a communication channel with the base station 200a and thereby increases the number of component carriers (step S132). After that, the base station 200a transmits data to the user equipment 100 at a rate exceeding a normal data rate over the expanded communication channel (step S134). The transmitted data is temporarily accumulated in the buffer 152 of the user equipment 100.

Then, the base station 200a transmits a shrink command for decreasing the number of component carriers to the user equipment 100 (step S136). In response thereto, the user equipment 100 shrinks the number of component carriers constituent of the communication channel with the base station 200a to one (step S140). The base station 200a then transmits a handover command for one component carrier after the shrinkage to the user equipment 100 (step S142).

Receiving the handover command, the user equipment 100 acquires synchronization with the downlink channel of the base station 200b (step S152). Then, the user equipment 100 makes a random access to the base station 200b by using a random access channel in a given time slot of the synchronized downlink channel (step S154). During this period, the base station 200a forwards data addressed to the user equipment 100 to the base station 200b (step S156). Then, after success in the random access, the user equipment 100 transmits a handover complete message to the base station 200b (step S162). Receiving the handover complete message, the base station 200b requests the MME to perform route update for the user equipment 100 (step S164). Upon updating the route of user data by the MME, the user equipment 100 becomes able to communicate with another device through a new base station (i.e. the base station 200b). Then, the base station 200b transmits acknowledgement for the handover complete message to the user equipment 100 (step S166).

After that, the user equipment 100 restarts the radio communication involving the carrier aggregation with the base station 200b, which is a new serving base station (step S180). Specifically, the user equipment 100 makes a random access to the base station 200b for an additional component carrier to establish a communication channel with the base station 200b, for example, and thereby increases the number of component carriers. It is thereby possible in the user equipment 100 to use the communication service again at substantially the same data rate as that before the start of the handover procedure.

Figure 8:
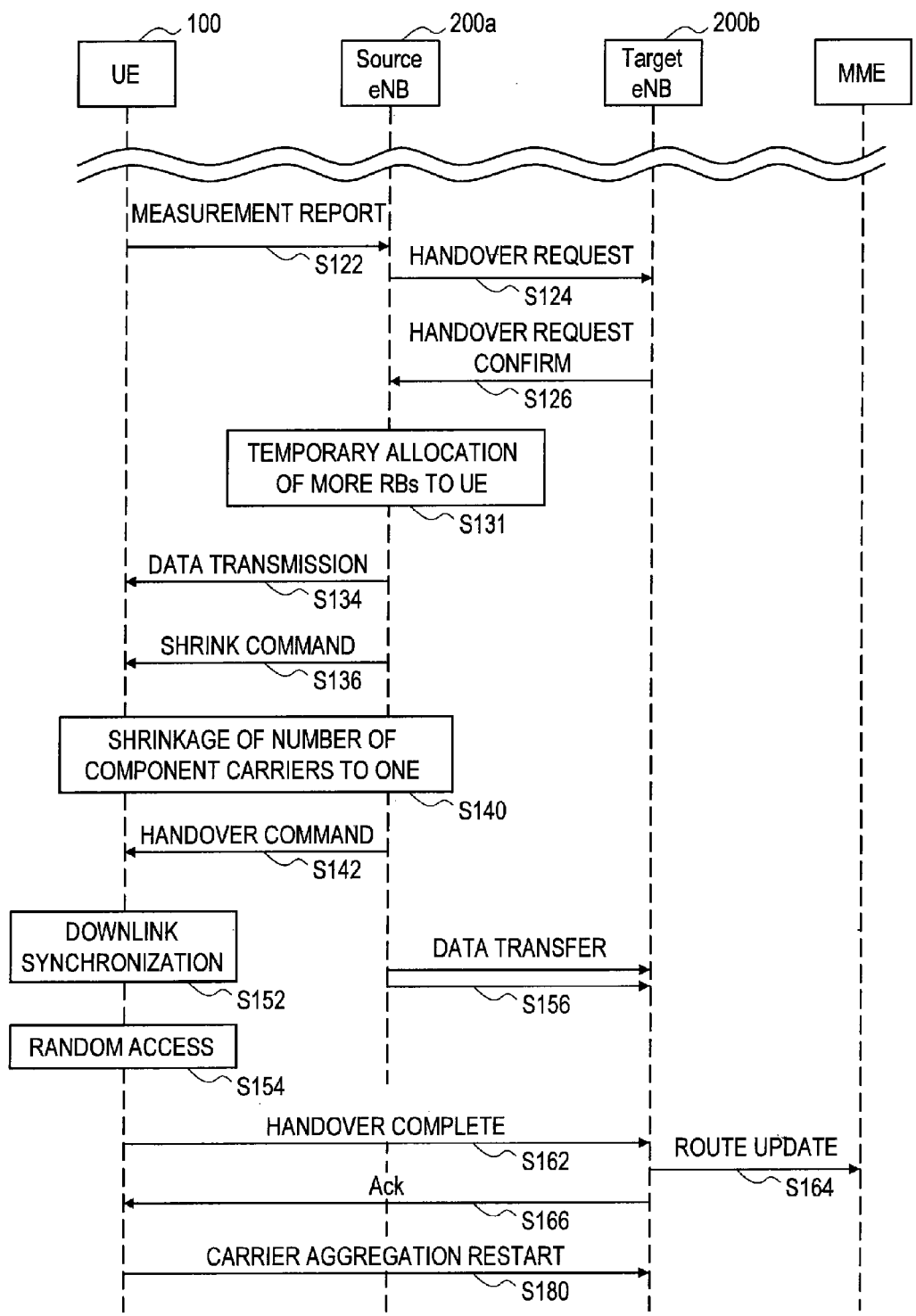
FIG. 8 is a sequence chart showing an example of a flow along a second scenario of a handover procedure according to the first embodiment.

FIG. 8 is a sequence chart showing an example of a flow along the second scenario of a handover procedure according to the embodiment. As is understood from comparison between FIG. 7 and FIG. 8, in the second scenario, the steps S130 and S132 in the first scenario are replaced by step S131.

In the second scenario, the base station 200a which has received the handover request confirm message first increases the number of resource blocks to be allocated to the user equipment 100 in at least one component carrier. The amount of communication resources available for the user equipment 100 thereby increases temporarily (step S131). After that, the base station 200a transmits data to the user equipment 100 at a rate exceeding a normal data rate by using the temporarily increased communication resources (step S134). The transmitted data is temporarily accumulated in the buffer 152 of the user equipment 100. Then, in the same procedure as in the first scenario, after the number of component carriers constituent of the communication channel between the user equipment 100 and the base station 200a is shrunk to one, a handover from the base station 200a to the base station 200b is carried out. The radio communication involving the carrier aggregation is then restarted between the user equipment 100 and the base station 200b.

3-4. Summary of First Embodiment

The first embodiment of the present invention is described above with reference to FIGS. 4 to 8. According to the embodiment, before a handover command is transmitted from the source base station to the user equipment, the number of component carriers constituent of the communication channel between the user equipment and the source base station is shrunk to one. It is thereby possible to carry out the procedure from transmission of a handover command to completion of a handover in the same procedure as the existing handover procedure.

Further, according to the embodiment, before the number of component carriers is shrunk to one, the amount of communication resources allocated to the user equipment is temporarily increased, and data is transmitted to the user equipment at a rate exceeding a normal data rate by using the communication resources. It is thereby possible to reduce the possibility of the occurrence of a failure caused by buffer under flow in the user equipment during the period until the user equipment restarts carrier aggregation with the target base station. Further, a temporary increase in the amount of communication resources can be made by an increase in the number of component carriers or an increase in the number of resource blocks. Because the increase in the number of component carriers and the increase in the number of resource blocks can be made by applying the existing scheme, the impact of such processing on the whole system is small. Further, in this embodiment, because a change in the number of component carriers is made under control of the base station, the impact on the user equipment, particularly, can be minimized.

Note that, in the step S134 of FIGS. 7 and 8, data may be transmitted from the user equipment to the base station, rather than transmitted from the base station to the user equipment at a rate exceeding a normal data rate by using the temporarily increased communication resources. In this case, in the user equipment that transmits contents to another equipment, a large amount of content data is transmitted in advance before the shrinkage of the number of component carriers, for example, thereby avoiding the occurrence of buffer over flow during the handover procedure.

4. Description of Second Embodiment

A second embodiment of the present invention is described hereinafter with reference to FIGS. 9 to 12.

4-1. Exemplary Configuration of User Equipment

Figure 9:
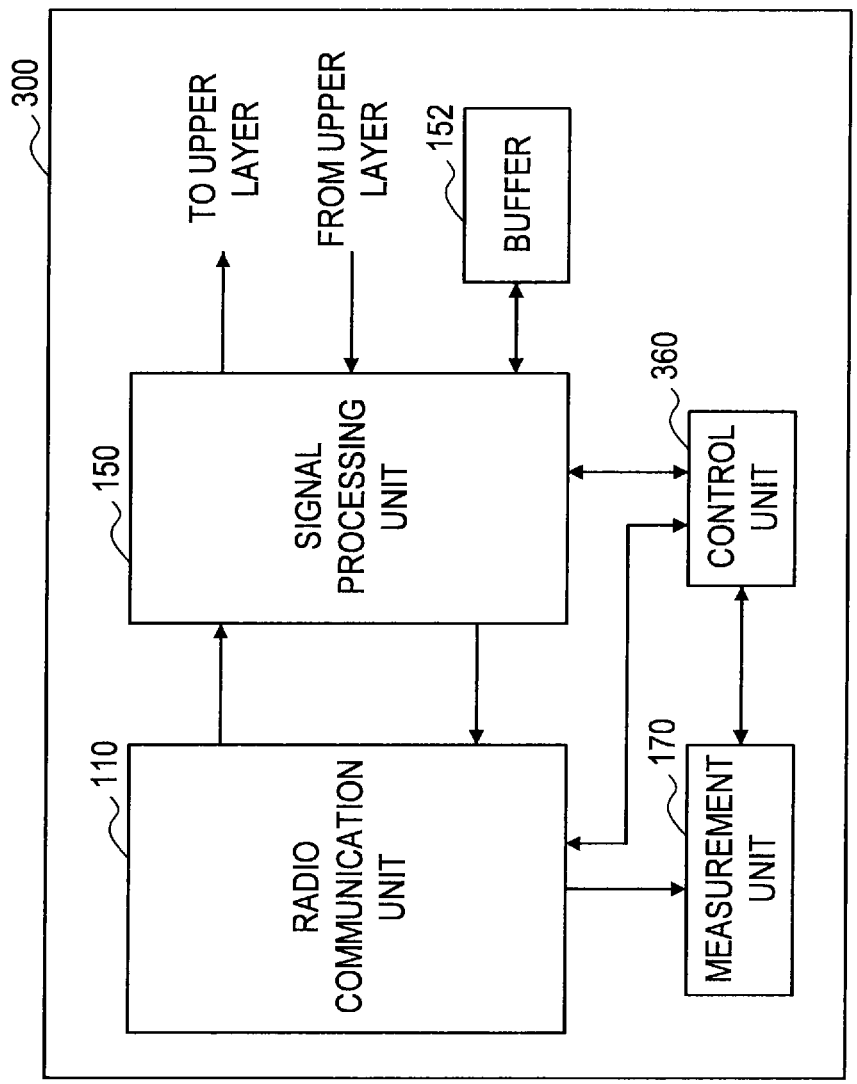
FIG. 9 is a block diagram showing an example of a configuration of a user equipment according to a second embodiment.

FIG. 9 is a block diagram showing an example of a configuration of a user equipment 300 according to the embodiment. Referring to FIG. 9, the user equipment 300 includes a radio communication unit 110, a signal processing unit 150, a buffer 152, a control unit 360, and a measurement unit 170.

(Control Unit)

The control unit 160 controls the overall functions of the user equipment 300 by using a processing device such as a CPU or a DSP. For example, the control unit 360 controls the timing of data communication by the radio communication unit 110 according to scheduling information that is received from a base station 400 by the radio communication unit 110. Further, as the preliminary step toward a handover, the control unit 360 shrinks the number of component carriers constituent of a communication channel with the base station 400 to one. The control unit 360 may shrink the number of component carriers before transmitting a measurement report to the base station 400 when a result of the measurement by the measurement unit 170 indicates that a handover should be started, for example. In this embodiment, the control unit 360 transmits a shrink request to the base station 400 and, after the shrink request is confirmed by the base station 400, the control unit 360 shrinks the number of component carriers to one. Further, before shrinking the number of component carriers to one, the control unit 360 temporarily increases the amount of communication resources available for the user equipment 300. The control unit 360 may temporarily increase the amount of communication resources available for the user equipment 300 by increasing the number of component carriers constituent of the communication channel with the base station 400, for example. Alternatively, the base station 400 which has received the shrink request may temporarily increase the number of resource blocks to be allocated to the user equipment 300 in at least one component carrier. After the control unit 360 transmits or receives data at a higher data rate than usual by using the communication resources which are increased in this manner and further shrinks the number of component carriers to one, the control unit 360 transmits a measurement report to the base station 400. After that, the control unit 360 controls the user equipment 300 to operate in the same manner as the user equipment in the handover procedure which is descried with reference to FIG. 1.

4-2. Exemplary Configuration of Base Station

Figure 10:
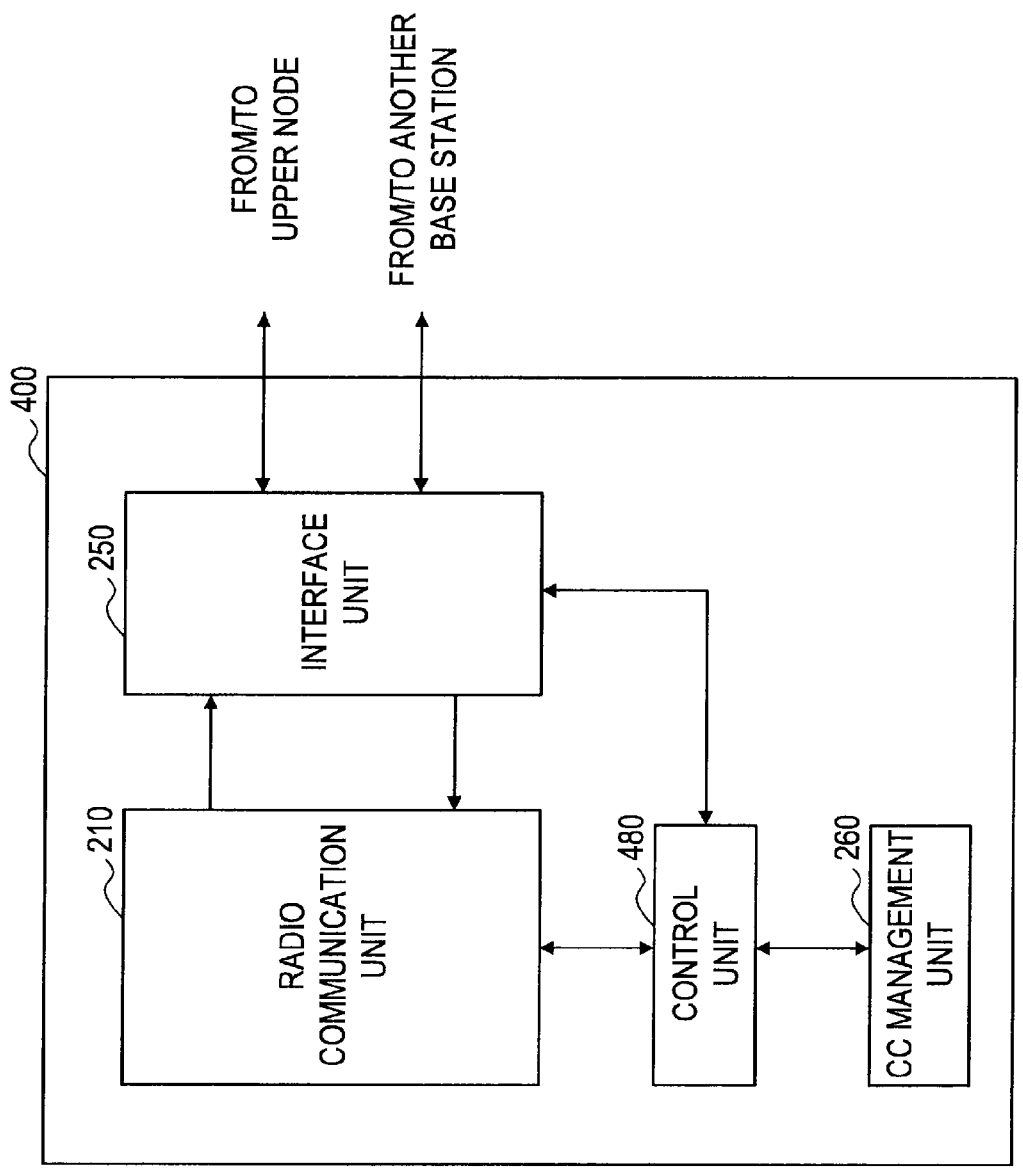
FIG. 10 is a block diagram showing an example of a configuration of a base station according to the second embodiment.

FIG. 10 is a block diagram showing an example of a configuration of the base station 400 according to the embodiment. Referring to FIG. 10, the base station 400 includes a radio communication unit 210, an interface unit 250, a CC management unit 260, and a control unit 480.

(Control Unit)

The control unit 480 controls the overall functions of the base station 400 by using a processing device such as a CPU or a DSP. For example, the control unit 480 allocates communication resources for data communication to the user equipment 300 and other user equipments and then delivers scheduling information over a broadcast channel in a given sub-frame.

Further, in this embodiment, in the case where the base station 400 is a source base station, the control unit 480 receives the above-described shrink request from the user equipment 300 through the radio communication unit 210. Further, before or after receiving the shrink request, the control unit 480 temporarily increases the amount of communication resources to be allocated to the user equipment 300 in response to a request from the user equipment 300. The control unit 480 may increase the above-described amount of communication resources by increasing the number of component carriers constituent of the communication channel with the user equipment 300, for example. Alternatively, the control unit 480 may increase the above-described amount of communication resources by increasing the number of resource blocks to be allocated to the user equipment 300 in at least one component carrier, for example. After the control unit 480 transmits/receives data to/from the user equipment 300 at a higher rate than usual by using the communication resources which are increased in this manner, the control unit 480 confirms the shrink request from the user equipment 300. As a result, the number of component carriers constituent of the communication channel between the user equipment 300 and the base station 400 is shrunk to one. Then, the control unit 480 carries out a handover for one component carrier after the shrinkage.

Further, in the case where the base station 400 is a target base station, when a handover by the user equipment 300 is completed, the control unit 480 restarts the radio communication involving the carrier aggregation by the user equipment 300 in response to a request from the user equipment 300.

4-3. Flow of Process

Two scenarios of a handover procedure according to the embodiment are described hereinbelow. Note that, in the following scenarios, it is assumed that a handover procedure is performed among the user equipment 300, the base station 400a serving as a source base station, and the base station 400b serving as a target base station. Further, for the procedure up to measurement in the user equipment (steps S2 to S14) in the typical handover procedure illustrated in FIG. 1, explanation is omitted because there is no significant difference.

Figure 11:
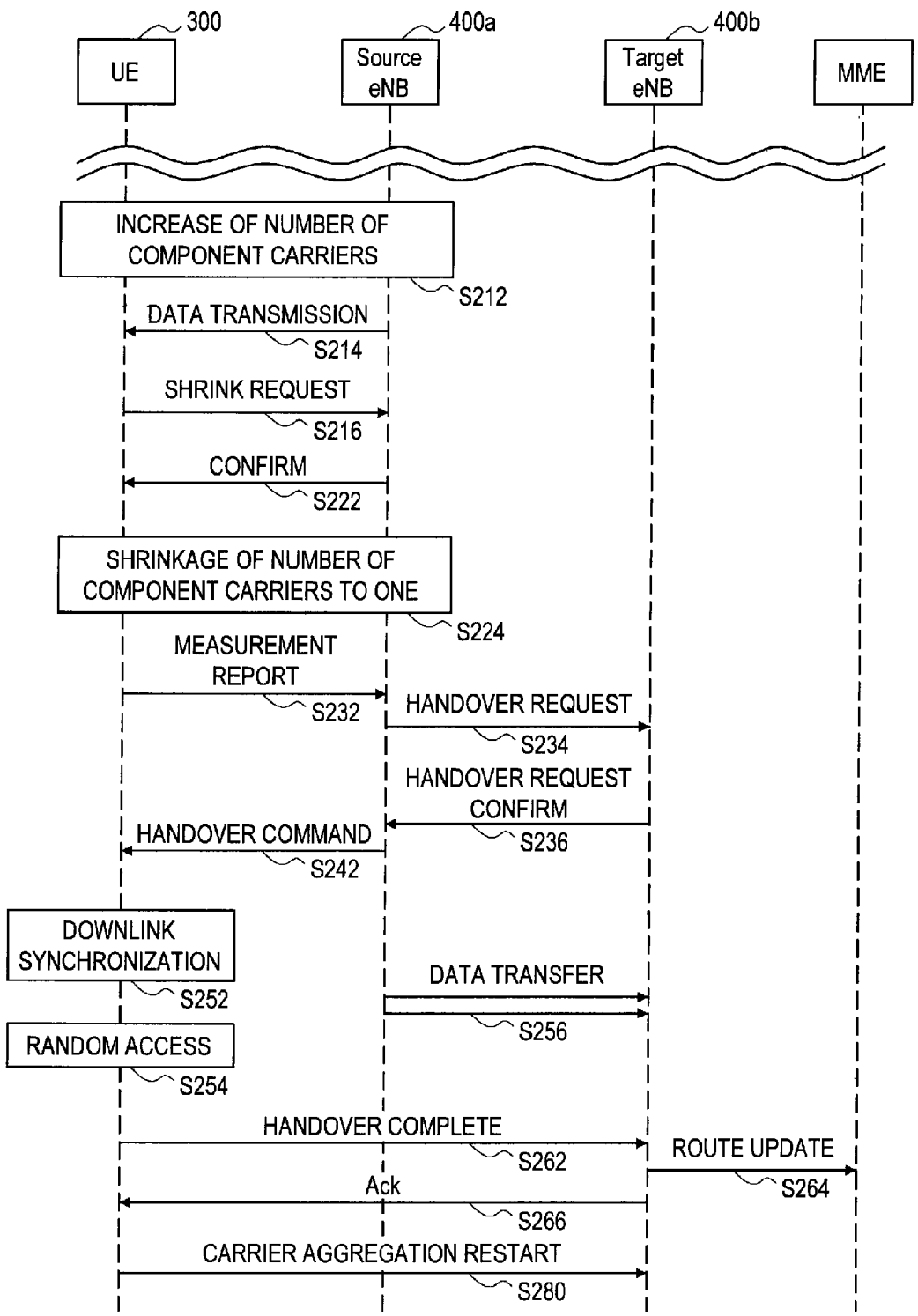
FIG. 11 is a sequence chart showing an example of a flow along a first scenario of a handover procedure according to the second embodiment.

FIG. 11 is a sequence chart showing an example of a flow along the first scenario of a handover procedure according to the embodiment. Referring to FIG. 11, the user equipment 300 first makes a random access to the base station 400a for a new component carrier to establish a communication channel with the base station 400a and thereby increases the number of component carriers (step S212). After that, the base station 400a transmits data to the user equipment 300 at a rate exceeding a normal data rate over the expanded communication channel (step S214). The transmitted data is temporarily accumulated in the buffer 152 of the user equipment 300. Note that, in the step S214, data may be received from the user equipment 300 rather than transmitted to the user equipment 300.

After the sufficient amount of data to avoid buffer under flow are accumulated in the buffer 152, for example, the user equipment 300 transmits a shrink request to the base station 400a (step S216). Then, the base station 400a transmits a confirm message for the shrink request to the user equipment 300 (step S222). The user equipment 300 then shrinks the number of component carriers constituent of the communication channel with the base station 400a to one (step S224).

Then, the user equipment 300 transmits a measurement report for one component carrier after the shrinkage to the base station 400a (step S232). Receiving the measurement report, the base station 400a transmits a handover request message to the base station 400b (step S234). Receiving the handover request message, the base station 400b determines whether it is possible to accept the user equipment 300 according to the availability of a communication service offered by itself or the like. When the base station 400b determines that it is possible to accept the user equipment 300, it transmits a handover request confirm message to the base station 400a (step S236). Receiving the handover request confirm message, the base station 400a transmits a handover command to the user equipment 300 (step S242).

Receiving the handover command, the user equipment 300 continues the handover procedure for one component carrier after the shrinkage. Specifically, the user equipment 300 first acquires synchronization with the downlink channel of the base station 400b (step S252). Then, the user equipment 300 makes a random access to the base station 400b by using a random access channel in a given time slot of the synchronized downlink channel (step S254). During this period, the base station 400a forwards data addressed to the user equipment 300 to the base station 400b (step S256). Then, after success in the random access, the user equipment 300 transmits a handover complete message to the base station 400b (step S262). Receiving the handover complete message, the base station 400b requests the MME to perform route update for the user equipment 300 (step S264). Then, the base station 400b transmits acknowledgement for the handover complete message to the user equipment 300 (step S266).

After that, the user equipment 300 restarts the radio communication involving the carrier aggregation with the base station 400b, which is a new serving base station (step S280). Specifically, the user equipment 300 makes a random access to the base station 400b for an additional component carrier to establish a communication channel with the base station 400b, for example, and thereby increases the number of component carriers. It is thereby possible in the user equipment 300 to use the communication service again at substantially the same data rate as that before the start of the handover procedure.

Figure 12:
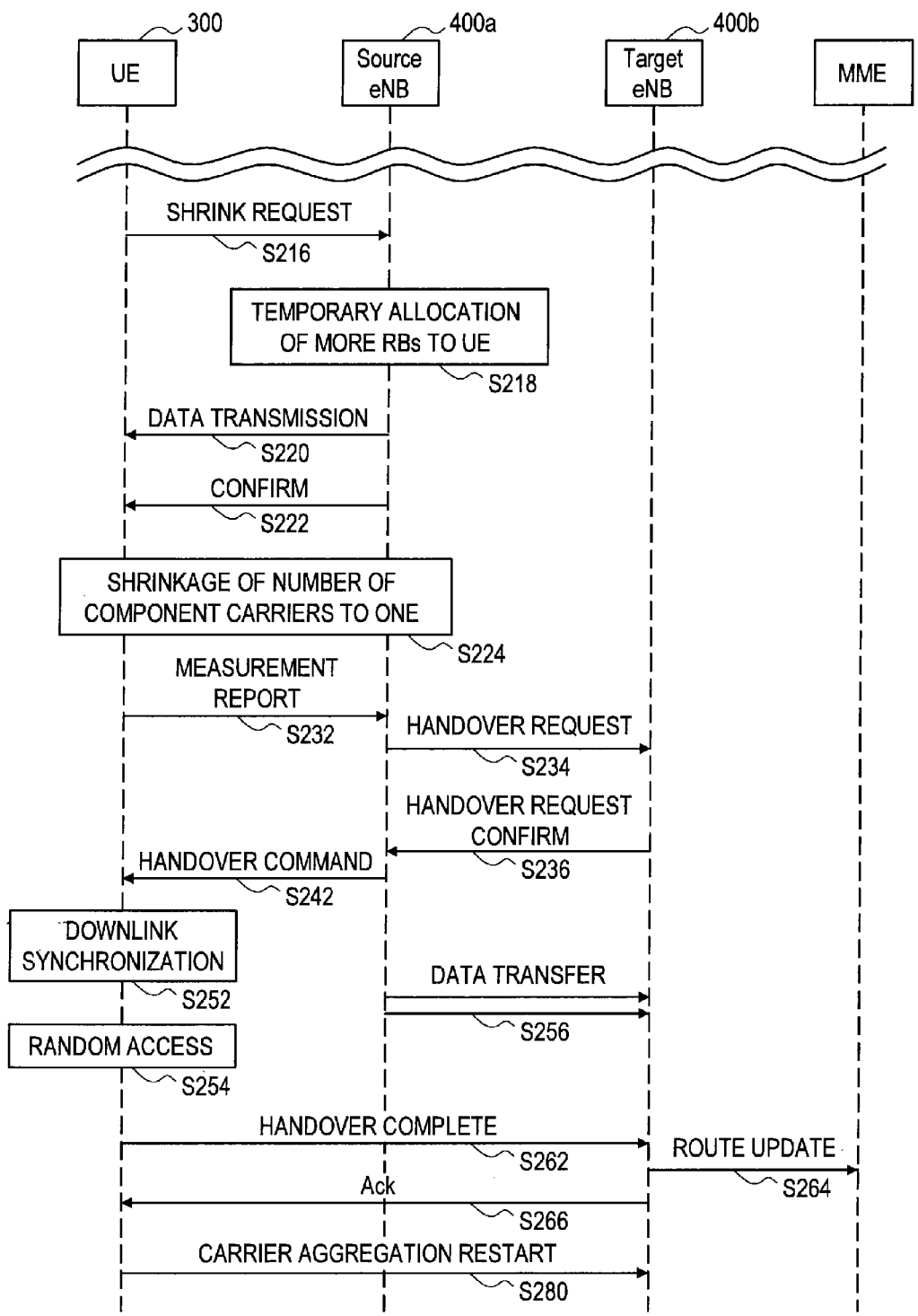
FIG. 12 is a sequence chart showing an example of a flow along a second scenario of a handover procedure according to the second embodiment.

FIG. 12 is a sequence chart showing an example of a flow along the second scenario of a handover procedure according to the embodiment. As is understood from comparison between FIG. 11 and FIG. 12, in the second scenario, the steps S212 to S222 in the first scenario are replaced by steps S216 to S222.

In the second scenario, the user equipment 300 which has recognized that a measurement result indicates that a handover should be started transmits a shrink request to the base station 400a (step S216). Receiving the shrink request, the base station 400a increases the number of resource blocks to be allocated to the user equipment 300 in at least one component carrier. The amount of communication resources available for the user equipment 300 thereby increases temporarily (step S218). After that, the base station 400a transmits data to the user equipment 300 at a rate exceeding a normal data rate by using the temporarily increased communication resources (step S220). The transmitted data is temporarily accumulated in the buffer 152 of the user equipment 300. After that, the base station 400a transmits a confirm message for the shrink request to the user equipment 300 (step S222). Then, in the same procedure as in the first scenario, after the number of component carriers constituent of the communication channel between the user equipment 300 and the base station 400a is shrunk to one, a handover from the base station 400a to the base station 400b is carried out. The radio communication involving the carrier aggregation is then restarted between the user equipment 300 and the base station 400b.

4-4. Summary of Second Embodiment

The second embodiment of the present invention is described above with reference to FIGS. 9 to 12. According to the embodiment, before a measurement report is transmitted from the user equipment to the source base station, the number of component carriers constituent of the communication channel between the user equipment and the source base station is shrunk to one. It is thereby possible to carry out the procedure from transmission of a measurement report to completion of a handover in the same procedure as the existing handover procedure.

Further, in this embodiment also, before the number of component carriers is shrunk to one, the amount of communication resources allocated to the user equipment is temporarily increased, and data is transmitted and received at a rate exceeding a normal data rate by using the communication resources. It is thereby possible to reduce the possibility of the occurrence of a failure caused by buffer under flow or buffer over flow in the user equipment during the period until the user equipment restarts carrier aggregation with the target base station. Further, in this embodiment, because a change in the number of component carriers is made in response to a request from the user equipment, the impact on the base station, particularly, can be minimized.

5. Description of Third Embodiment

A third embodiment of the present invention is described hereinafter with reference to FIGS. 13 to 15.

5-1. Exemplary Configuration of User Equipment

Figure 13:
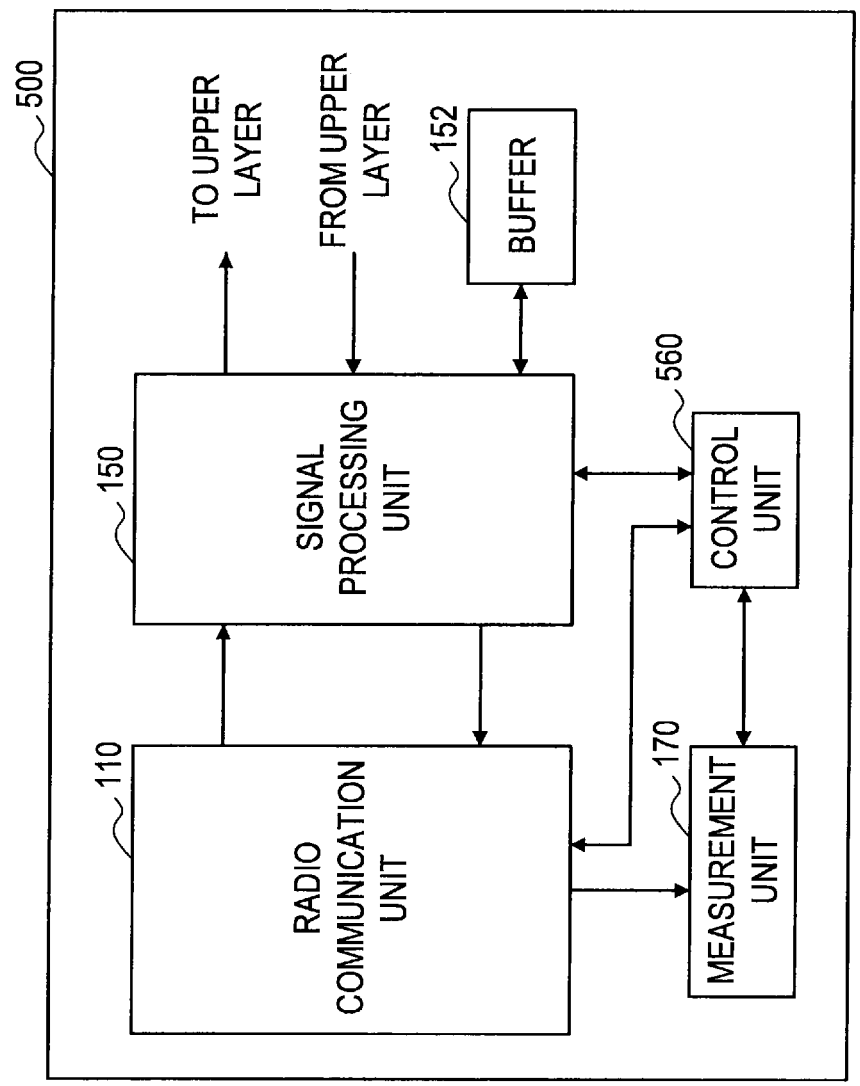
FIG. 13 is a block diagram showing an example of a configuration of a user equipment according to a third embodiment.

FIG. 13 is a block diagram showing an example of a configuration of a user equipment 500 according to the embodiment. Referring to FIG. 13, the user equipment 500 includes a radio communication unit 110, a signal processing unit 150, a buffer 152, a control unit 560, and a measurement unit 170.

(Control Unit)

The control unit 560 controls the overall functions of the user equipment 500 by using a processing device such as a CPU or a DSP. For example, the control unit 560 controls the timing of data communication by the radio communication unit 110 according to scheduling information that is received from a base station 600 by the radio communication unit 110. Further, as the preliminary step toward a handover, the control unit 560 shrinks the number of component carriers constituent of a communication channel with a source base station to one. Further, after completing a handover for one component carrier after the shrinkage, the control unit 560 temporarily receives an allocation of many communication resources from a target base station and performs data communication at a rate exceeding a normal data rate.

5-2. Exemplary Configuration of Base Station

Figure 14:
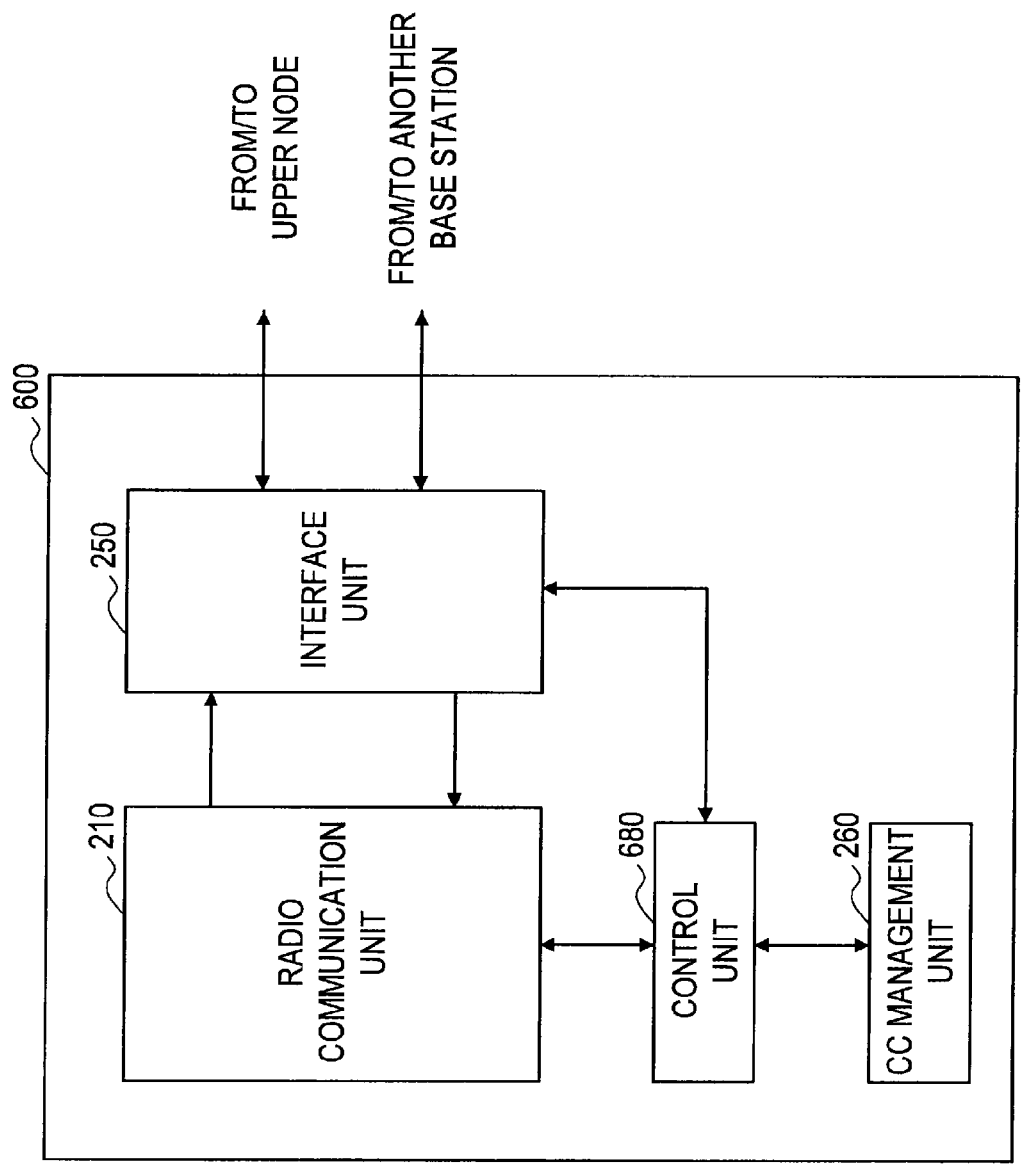
FIG. 14 is a block diagram showing an example of a configuration of a base station according to the third embodiment.

FIG. 14 is a block diagram showing an example of a configuration of the base station 600 according to the embodiment. Referring to FIG. 14, the base station 600 includes a radio communication unit 210, an interface unit 250, a CC management unit 260, and a control unit 680.

(Control Unit)

According to some embodiments, the control unit is further configured to adjust a timing of a handover to compensate for a decrease in data throughput due to the reduction of the plurality of component carriers to one. In further embodiments, the timing of the hand over is decided based on a likelihood of success in a random access.

The control unit 680 controls the overall functions of the base station 600 by using a processing device such as a CPU or a DSP. For example, the control unit 680 allocates communication resources for data communication to the user equipment 500 and other user equipments and then delivers scheduling information over a broadcast channel in a given sub-frame.

Further, in this embodiment, in the case where the base station 600 is a source base station, when a handover request is confirmed by a target base station, the control unit 680 transmits a shrink command to the user equipment 500 before transmitting a handover command. The number of component carriers constituent of the communication channel between the user equipment 500 and the base station 600 is thereby shrunk to one. Then, the control unit 680 transmits a handover command for one component carrier after the shrinkage to the user equipment 500.

Further, in this embodiment, in the case where the base station 600 is a target base station, when a handover request is received from a source base station, the control unit 680 monitors the availability of communication resources. Then, the control unit 680 adjusts the timing to confirm the handover request from the source base station so that a decrease in throughput due to the shrinkage of the number of component carriers is suppressed or compensated.

Specifically, when a random access from the user equipment 500 is success, for example, the control unit 680 confirms the handover request after waiting until the timing at which a sufficient amount of communication resources can be allocated to the user equipment 500. The sufficient amount may be the amount of communication resources which enables an allocation of substantially the same number of component carries as the number of component carriers before the handover (shrinkage) to a new communication channel, for example. In this case, by recovering the number of component carriers promptly after the handover, it is possible to reduce the time during which a throughput decreases due to the handover. Note that the number of component carriers before the handover can be notified from the source base station to the target base station by advance negotiation or using a handover request message or another message, for example.

Further, the sufficient amount may be the amount of communication resources which enables a recovery of the amount of data accumulated in the buffer of the user equipment at the receiving end of data to the amount not causing buffer under flow, for example. The amount of communication resources may be defined in advance, or notified from a source base station by using a handover request message or the like. In this case, after a random access from the user equipment 500 succeeds, the amount of communication resources allocated to the user equipment 500 is temporarily increased, thereby compensating a decrease in throughput that occurs due to the shrinkage of the number of component carriers.

Furthermore, the control unit 680 may confirm the handover request after waiting until the timing at which it is determined that the possibility of success in a random access from the user equipment 500 is high. An example of the timing when the possibility of success in a random access is high is timing at which there are not a large number of other user equipments that are trying to make a random access (e.g. another user equipment that has started a handover, a user equipment in the idle mode etc.). In this case, it is possible to prevent a delay of a handover caused by a failure and retry of a random access and reduce the time during which a throughput decreases due to the handover.

5-3. Flow of Process

An example of a flow of a handover procedure according to the embodiment is described hereinbelow. Note that, in the following scenario, it is assumed that a handover procedure is performed among the user equipment 500, the base station 600a serving as a source base station, and the base station 600b serving as a target base station. Further, for the procedure up to measurement in the user equipment (steps S2 to S14) in the typical handover procedure illustrated in FIG. 1, explanation is omitted because there is no significant difference.

Figure 15:
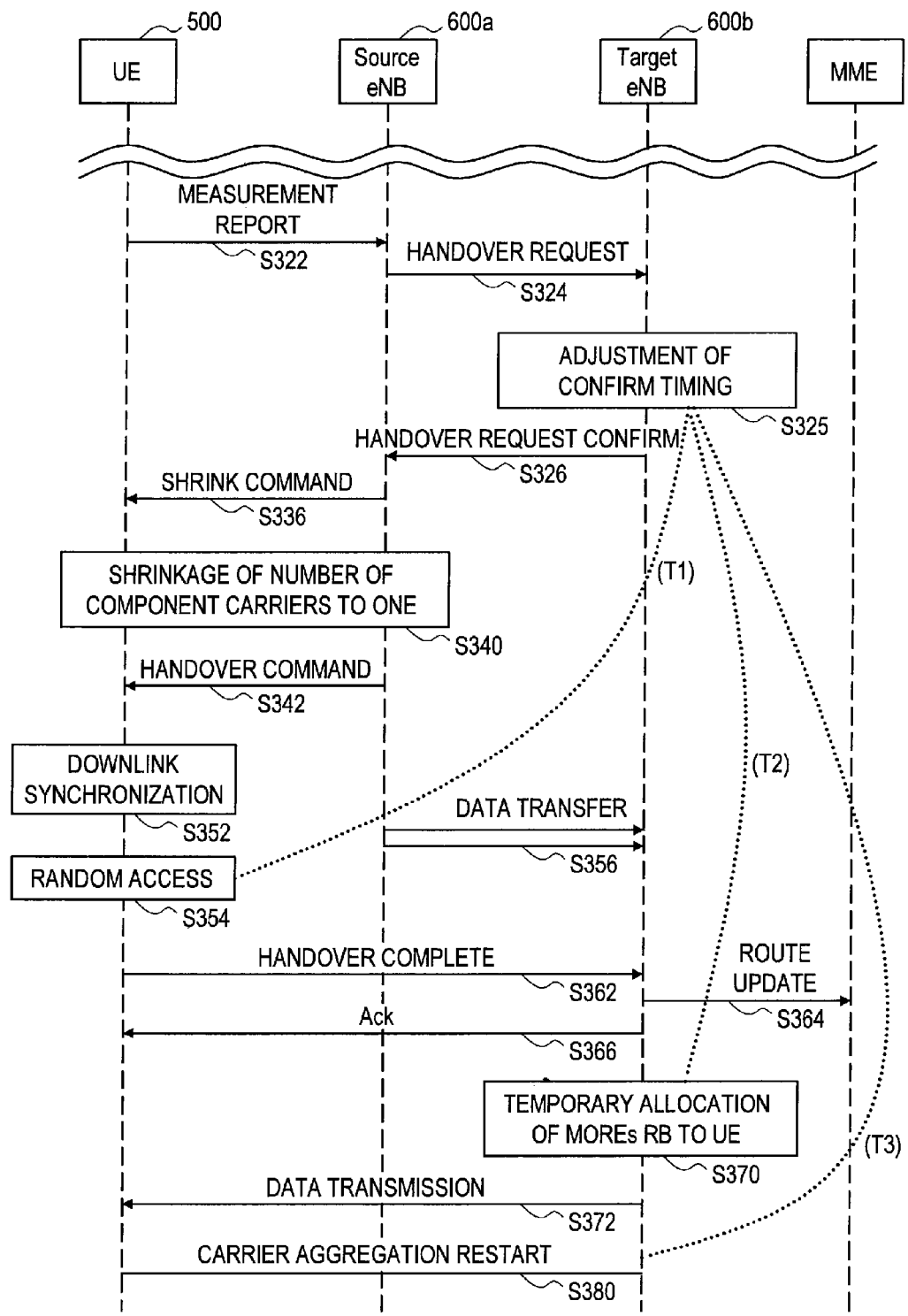
FIG. 15 is a sequence chart showing an example of a flow of a handover procedure according to the third embodiment.

FIG. 15 is a sequence chart showing an example of a flow of a handover procedure according to the embodiment. Referring to FIG. 15, the user equipment 500 first transmits a measurement report for a plurality of component carriers constituent of a communication channel to the base station 600a (step S322). The base station 600a which has determined that a handover is necessary based on the measurement report transmits a handover request message to the base station 600b (step S324). Receiving the handover request message, the base station 600b adjusts the timing to confirm the handover request so that a decrease in throughput due to the shrinkage of the number of component carriers is suppressed or compensated. (step S325). Then, the base station 600b transmits a handover request confirm message to the base station 600a at timing (T1) when the subsequent random access is likely to succeed, timing (T2) when more communication resources can be allocated after completion of a handover, or timing (T3) when carrier aggregation can be restarted promptly after completion of a handover, for example (step S326).

Receiving the handover request confirm message, the base station 600a transmits a shrink command for decreasing the number of component carriers to the user equipment 500 (step S336). After that, the user equipment 500 shrinks the number of component carriers constituent of the communication channel with the base station 600a to one (step S340). The base station 600a then transmits a handover command for one component carrier after the shrinkage to the user equipment 500 (step S342).

Receiving the handover command, the user equipment 500 continues the handover procedure for one component carrier after the shrinkage. Specifically, the user equipment 500 first acquires synchronization with the downlink channel of the base station 600b (step S352). Then, the user equipment 500 makes a random access to the base station 600b by using a random access channel in a given time slot of the synchronized downlink channel (step S354). During this period, the base station 600a forwards data addressed to the user equipment 500 to the base station 600b (step S356). Then, after success in the random access, the user equipment 500 transmits a handover complete message to the base station 600b (step S362). Receiving the handover complete message, the base station 600b requests the MME to perform route update for the user equipment 500 (step S364). Then, the base station 600b transmits acknowledgement for the handover complete message to the user equipment 500 (step S366).

After that, the base station 600b temporarily allocates a larger number of resource blocks to the user equipment 500, for example (step S370). Then, the base station 600b transmits data to the user equipment 500 at a rate exceeding a normal data rate (step S372). The transmitted data recovers the amount of data which has decreased during the handover procedure in the buffer 152 of the user equipment 500. Note that, in the step S372, data may be received from the user equipment 500, rather than transmitted to the user equipment 500. After that, the user equipment 500 restarts the radio communication involving the carrier aggregation with the base station 600b, which is a new serving base station (step S380).

5-4. Summary of Third Embodiment

The third embodiment of the present invention is described above with reference to FIGS. 13 to 15. According to the embodiment, before a handover command is transmitted from a source base station to a user equipment, the number of component carriers constituent of the communication channel between the user equipment and the source base station is shrunk to one. It is thereby possible to carry out the procedure from transmission of a handover command to completion of a handover in the same procedure as the existing handover procedure.

Further, in this embodiment, after success in a random access from a user equipment to a target base station, the amount of communication resources allocated to the user equipment is temporarily increased in the target base station. Then, by using the communication resources, data is transmitted/received to/from the user equipment at a rate exceeding a normal data rate. It is thereby possible to compensate a decrease in throughput that occurs due to the shrinkage of the number of component carriers.

Furthermore, in this embodiment, the timing to confirm the handover request in the target base station is adjusted so as to suppress or compensate a decrease in throughput due to the shrinkage of the number of component carriers. It is thereby possible to reduce the possibility that a failure occurs in a communication service such as contents delivery due to a decrease in throughput.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 RADIO COMMUNICATION SYSTEM
100, 300, 500 USER EQUIPMENT
110 RADIO COMMUNICATION UNIT (USER EQUIPMENT)
160, 360, 560 CONTROL UNIT (USER EQUIPMENT)
200, 400, 600 BASE STATION
210 RADIO COMMUNICATION UNIT (BASE STATION)
280, 480, 680 CONTROL UNIT (BASE STATION)

The invention claimed is:

1. An electronic device comprising:
circuitry configured to
establish communication with a mobile communication terminal using a plurality of component carriers;
increase a number of resource blocks allocated to a first component carrier of the plurality of component carriers; and
control transmitting a command to the mobile communication terminal to deactivate the plurality of component carriers with the exception of the first component carrier after increasing the number of resource blocks allocated to the first component carrier of the plurality of component carriers.

2. The electronic device according to claim 1, wherein the circuitry is configured to control transmitting a command to the mobile communication terminal to increase the plurality of component carriers used between the electronic device and mobile communication terminal to increase data throughput.

3. The electronic device according to claim 1, wherein the circuitry is configured to increase the number of resource blocks allocated to the first component carrier to increase data throughput.

4. The electronic device according to claim 1, wherein the circuitry is configured to adjust a timing of a handover to compensate for a decrease in data throughput due to the deactivation of the plurality of component carriers with the exception of the first component carrier.

5. The electronic device according to claim 4, wherein the timing of the handover is decided based on a likelihood of success in a random access.

6. An electronic device comprising:
circuitry configured to
establish communication with a base station using a plurality of component carriers; and
control receiving a command from the base station to deactivate the plurality of component carriers with the exception of a first component carrier of the plurality of component carriers, wherein a number of resource blocks allocated to the first component carrier is increased before the command is sent by the base station.

7. The electronic device according to claim 6, wherein the circuitry is configured to restart use of the plurality of component carriers after completion of a handover from the base station to another base station.

8. The electronic device according to claim 6, wherein the circuitry is configured to receive a command from the base station to increase data throughput of the communication between the electronic device and the base station prior to reception of the command to deactivate the plurality of component carriers with the exception of a first component carrier.

9. The electronic device according to claim 8, wherein the command from the base station to increase the data throughput instructs the circuitry to increase the plurality of component carriers used between the base station and the electronic device.

10. The electronic device according to claim 6, wherein a timing of a handover is decided based on a possibility of success in a random access.

11. A communication system comprising:
a first electronic device including:
   first circuitry configured to
      establish communication with a second electronic device using a plurality of component carriers;
      increase a number of resource blocks allocated to a first component carrier of the plurality of component carriers; and
      control transmitting a command to the second electronic device to deactivate the plurality of component carriers with the exception of the first component carrier after increasing the number of resource blocks allocated to the first component carrier of the plurality of component carriers; and
the second electronic device including:
   second circuitry configured to deactivate the plurality of component carriers with the exception of the first component carrier upon reception of the command from the first electronic device.

12. The communication system according to claim 11, wherein the second circuitry is configured to restart use of the plurality of component carriers after completion of a handover of the second electronic device from the first electronic device to a third electronic device.

13. The communication system according to claim 11, wherein the first circuitry is configured to transmit a command to the second electronic device to increase the plurality of component carriers used between the first electronic device and the second electronic device to increase data throughput.

14. The communication system according to claim 11, wherein the first circuitry is configured to increase the number of resource blocks allocated to the first component carrier to increase data throughput.

15. The communication system according to claim 12, wherein the first circuitry is configured to adjust a timing of a handover to compensate for a decrease in data throughput due to the deactivation of the plurality of component carriers with the exception of the first component carrier.

16. The communication station according to claim 15, wherein the timing of the handover is decided based on a likelihood of success in a random access.

17. A non-transitory computer readable medium having instructions stored thereon, which when executed by circuitry of an electronic device causes the electronic device to:
   establish communication with a mobile communication terminal using a plurality of component carriers;
   increase a number of resource blocks allocated to a first component carrier of the plurality of component carriers; and
   control transmitting a command to the mobile communication terminal to deactivate the plurality of component carriers with the exception of the first component carrier after increasing the number of resource blocks allocated to the first component carrier of the plurality of component carriers.

* * * * *